United States Patent [19]
Yamaguchi et al.

[11] Patent Number: 5,486,882
[45] Date of Patent: Jan. 23, 1996

[54] IMAGE PROJECTING APPARATUS

[75] Inventors: Yukuo Yamaguchi; Kazuhiko Onuki, both of Tokyo; Kazuhide Sugiyama, Yokohama, all of Japan

[73] Assignee: Canon Kabushiki Kaisha, Tokyo, Japan

[21] Appl. No.: 195,198

[22] Filed: Feb. 14, 1994

[30] Foreign Application Priority Data

| Feb. 17, 1993 | [JP] | Japan | 5-051449 |
| Feb. 25, 1993 | [JP] | Japan | 5-036584 |
| Mar. 12, 1993 | [JP] | Japan | 5-052231 |

[51] Int. Cl.$^6$ ............................................. G03B 21/28
[52] U.S. Cl. ................................. 353/77; 353/119
[58] Field of Search .................... 353/27 A, 27 R, 353/26 A, 26 R, 25, 74, 75, 77, 76, 78, 79, 72, 73, 98, 99, 119; 348/786, 787, 789, 794, 836, 842; 355/44, 45, 68, 69, 71, 74

[56] References Cited

U.S. PATENT DOCUMENTS

| 3,950,085 | 4/1976 | Grimm | 353/77 |
| 4,351,592 | 9/1982 | Link et al. | 353/72 |
| 4,506,976 | 3/1985 | Kiejzik | 355/45 |
| 4,666,284 | 5/1987 | Yamada | 355/45 |
| 4,842,402 | 6/1989 | Wise | 353/74 |
| 4,846,570 | 7/1989 | Kanai | 353/DIG. 3 |
| 4,881,099 | 11/1989 | Onuki et al. | 355/45 |
| 5,028,128 | 7/1991 | Onuki | 353/122 |
| 5,047,800 | 9/1991 | Fukumoto et al. | 355/45 |

FOREIGN PATENT DOCUMENTS

| 58-161480 | 9/1983 | Japan . |
| 62-105126 | 5/1987 | Japan . |

*Primary Examiner*—William C. Dowling
*Attorney, Agent, or Firm*—Fitzpatrick, Cella, Harper & Scinto

[57] ABSTRACT

In an image projecting apparatus such as a microfilm reader and a microfilm reader printer, the inclination angle of a screen surface can be changed without causing distortion and blur in a projected image on the screen surface. The inclination angle of the screen can be changed for the user to see the screen surface with ease such that the screen surface becomes perpendicular to the user's line of sight and the external light reflected by the screen surface is prevented from entering the user's eyes.

24 Claims, 20 Drawing Sheets

IMAGE PROJECTING APPARATUS

BACKGROUND OF THE INVENTION

1. Field of the Invention

The present invention relates to an image projecting apparatus such as a microfilm reader and a microfilm reader printer.

2. Related Background Art

In a conventional film reader or reader printer, generally, a screen of a reader section is secured to its apparatus body in an upright state. Therefore, the angle of the screen cannot be changed.

Then, when observing an image projected on the screen, depending on the height of the apparatus, the height of the chair or users' sitting heights, some users cannot see the screen surface well and need to see it upwardly (angle of elevation) or downwardly (angle of depression) as their line of sight does not become perpendicular thereto.

Also, even though the external light such as fluorescent light and outdoor daylight reflected by the screen surface enters users' eyes and the users cannot see the projected image on the screen surface well, they cannot prevent its condition by changing the angle of the screen.

SUMMARY OF THE INVENTION

It is therefore an object of the present invention to provide an image projecting apparatus which enables a user to see the surface of a screen with ease.

The above and other objects of the present invention can be achieved by providing an image projecting apparatus for projecting an image of an image carrying member on a screen whose inclination angle is adjustable.

In a preferred embodiment, at least one reflection mirror is provided in a projection optical system for projecting the image of the image carrying member on the screen. When changing the inclination angle of the screen, both the screen and the reflection mirror are rotated correspondingly such that the optical axis of the projection optical axis directed to the screen surface is constantly kept approximately perpendicular to the screen surface.

In another preferred embodiment, both the screen and the image carrying member are correspondingly rotated when changing the inclination angle of the screen.

According to the present invention, since the screen is rotatable, it is possible to adjust the inclination angle of the screen for the user to see the screen surface well, such that the screen surface becomes perpendicular to the user's line of sight or the external light reflected by the screen surface is prevented from entering the user's eyes.

Also, since both the screen and the at least one reflection mirror are correspondingly rotated at the time of changing the inclination angle of the screen such that the optical axis of the projection optical system directed to the screen surface is constantly kept approximately perpendicular to the screen surface, no distortion or blur occurs in the projected image on the screen surface even though the inclination angle of the screen surface is changed so as to be suitable for the user's line of sight or to prevent the external light reflected by the screen surface from entering the user's eyes.

Further, both the inclination angles of the screen surface and the image carrying member are changeable, so that no blur occurs in the projected image on the screen surface even though the inclination angle of the screen is changed so as to be suitable for the user's line of sight or to prevent the external light from entering the user's eyes.

DETAILED DESCRIPTION OF THE PREFERRED EMBODIMENTS

Figure 1:
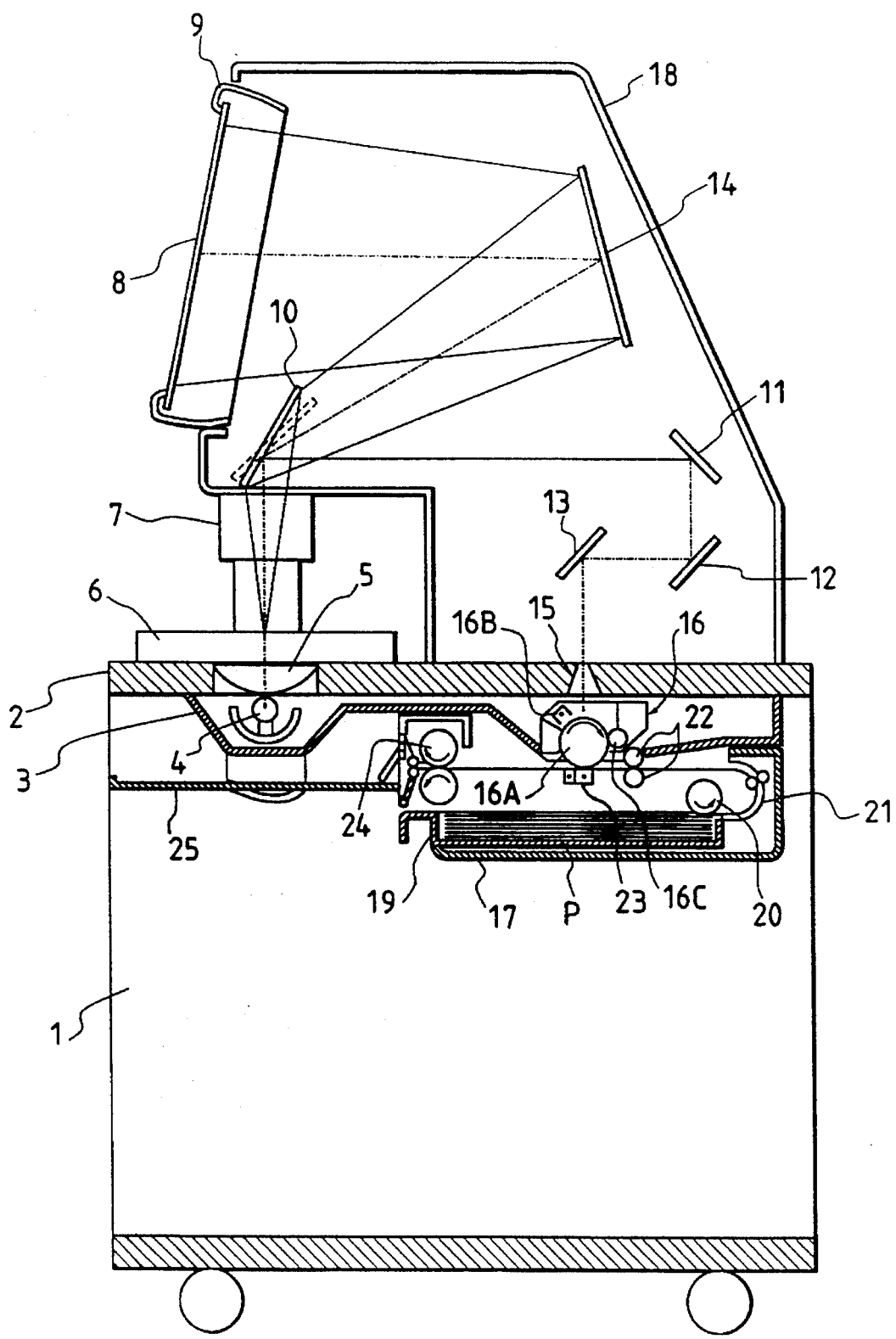
FIG. 1 is a schematic diagram of a microfilm reader printer of a first embodiment according to the present invention.
Figure 2:
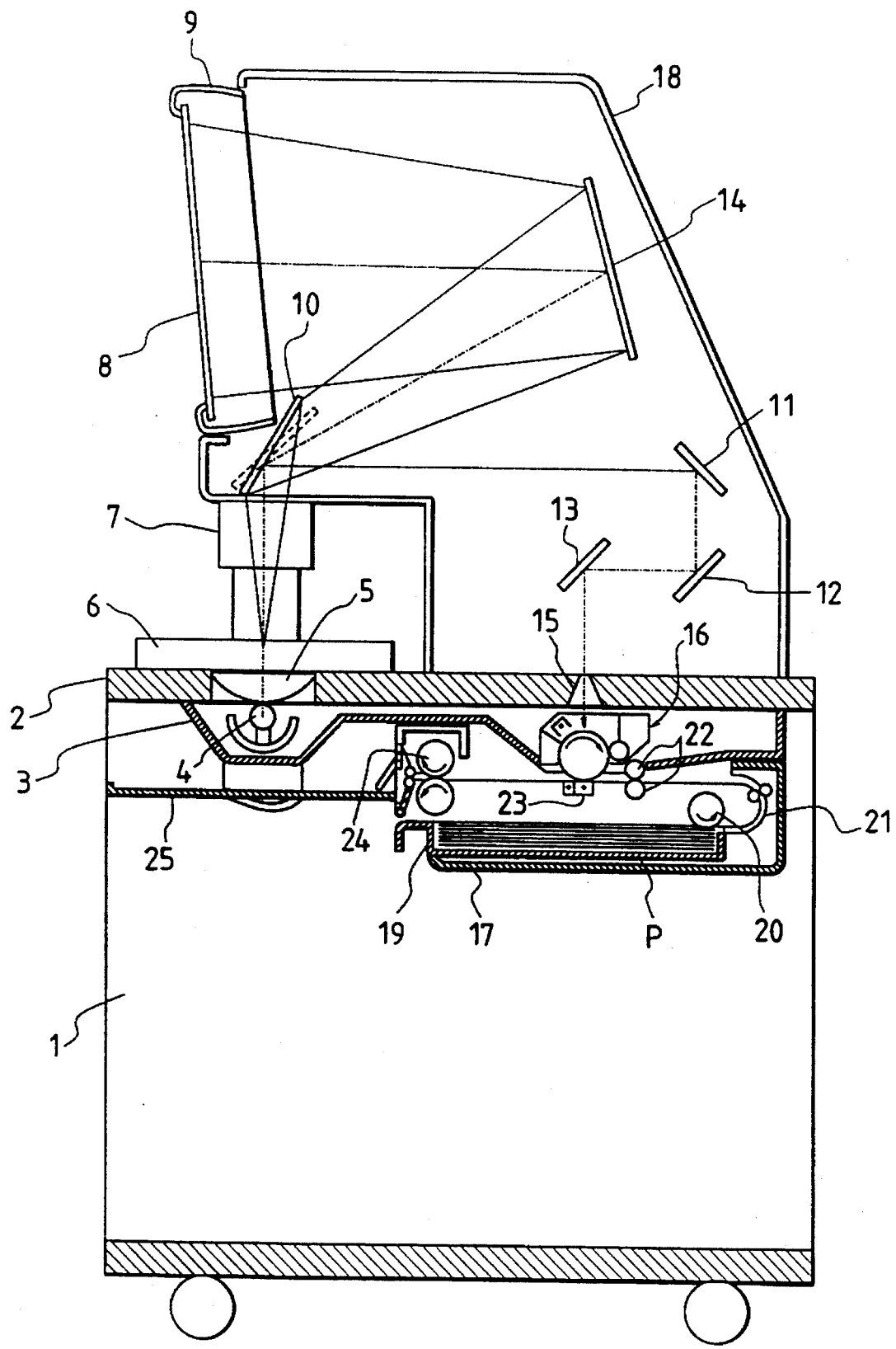
FIG. 2 is a schematic diagram of the microfilm reader printer of the first embodiment, wherein the screen is inclined.
Figure 3:
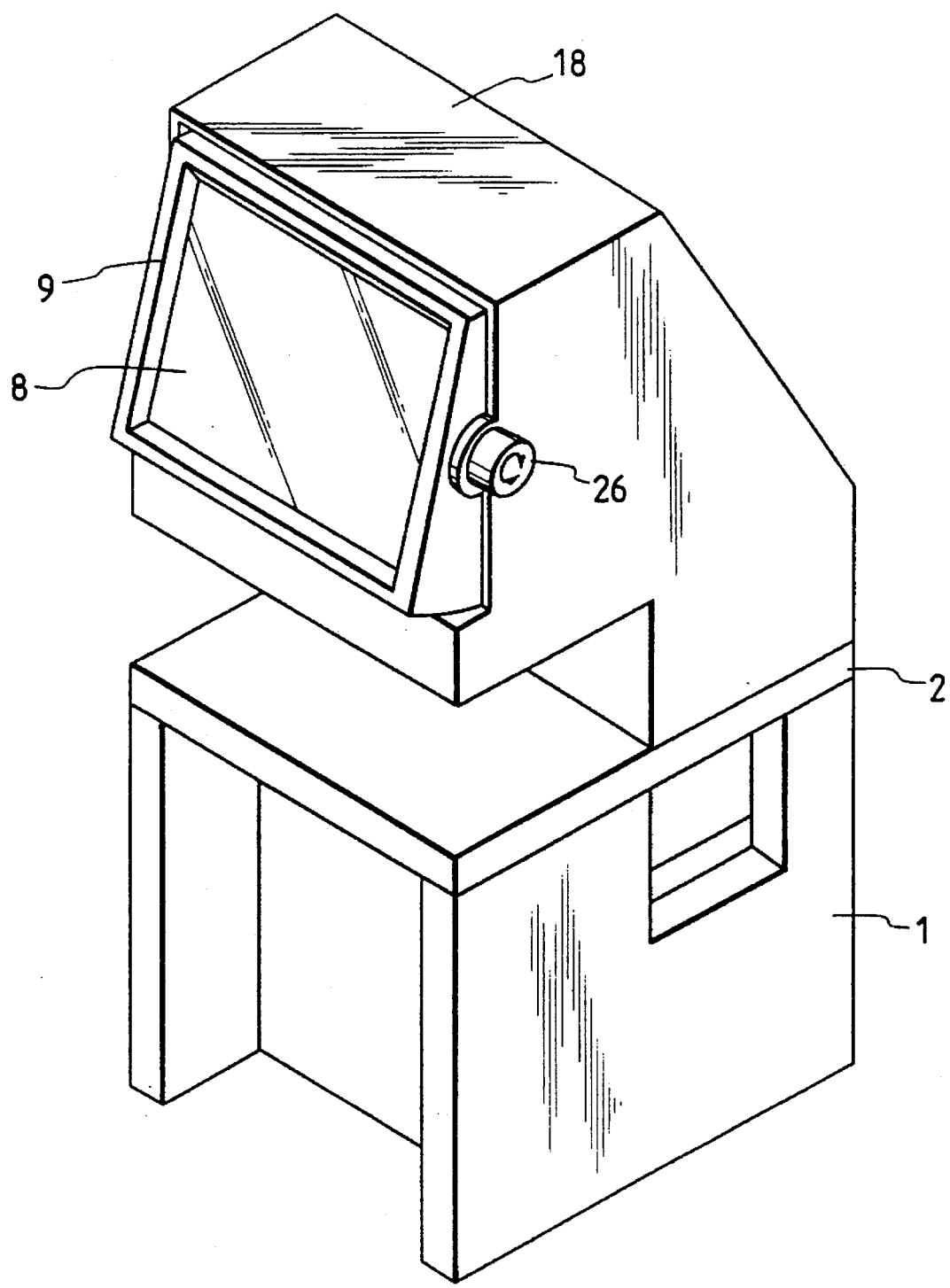
FIG. 3 is a schematic perspective view of the microfilm reader printer of the first embodiment.

FIGS. 1 to 3 are schematic diagrams of a microfilm reader printer of a first embodiment according to the present invention.

In FIGS. 1 and 2, the microfilm reader printer has a base stand 1 as an apparatus body and an approximately horizontal table 2 on the top of the base stand 1.

A partition wall 3 is provided under the table 2 and a lamp 4 is provided between the table 2 and the partition wall 3 on the front side of the base stand 1, i.e., on the left side in the drawing. A condenser lens 5 is provided in the table 2. A microfiche carrier 6 and an image-forming lens 7 are mounted on the table 2.

On the table 2 is provided a casing 18 having a transmission-type screen 8, a screen frame 9 for holding the screen 8 and mirrors 10 to 14. The screen frame 9 is rotatable in the upward or downward direction with respect to the casing 18 due to a knob 26 mounted rotatably on the screen frame 9, as illustrated in FIG. 3. Rotation of the knob 26 causes the screen 8 to rotate upwardly or downwardly via the screen frame 9 to change the inclination angle of the screen surface. When stopping the rotation of the knob 26, the rotation of the screen frame 9 is stopped, whereby the screen 8 is held in the adjusted inclination position. The screen 8 is a transmission-type diffusion plate which is formed by coating a frosted glass, a glass or an acrylic plate with a light diffusion layer, or dispersing fine grain and high diffusion type substance on a wax sheet.

A slit 15 is provided in the table 2 under the mirror 13 and further a process cartridge 16 as a printer section is mounted removably under the slit 15. The process cartridge 16 contains a sensitive drum 16A, an electrifier 16B, a developing unit 16C, a cleaning unit or the like.

A paper feeding section 17 is provided under the process cartridge 16. Over the paper feeding section 17 are provided a removable paper cassette 19 with transfer papers P as well as a feed roller 20, a U-shaped feeding passage 21, a pair of resist rollers 22, a transfer charger 23 and fixing rollers 24. Further, there is provided under the partition wall 3 on the front side of the paper feeding section 17 a paper tray 25 for receiving printed transfer papers.

In the reader mode, a desired image frame of a microfiche (not illustrated) is disposed on the carrier 6 so as to be positioned over the condenser lens 5.

The image frame is illuminated from under by the light of the lamp 4. The light transmitted through the image frame passes through the image-forming lens 7 and is reflected by the mirrors 10 and 14 to project the magnified image of the image information of the image frame, which can be observed outside the screen 8.

On the other hand, in the print mode, upon depression of a copy key (not illustrated), the mirror 10 is rotated to cause the incident light from the image-forming lens 7 to the casing 18 to be reflected sequentially by the mirrors 10, 11, 12 and 13 to reach the sensitive drum 16A through the slit 15. As a result, the enlarged image of the image information of the image frame is projected on the sensitive drum 16A (slit scan exposure).

At this time, the transfer paper P is fed through the U-shaped feeding passage 21 under the process cartridge 16 in synchronism with the above operation thereby to transfer the image frame of the microfiche. The transfer paper P with the transferred image is subjected to the fixing process via the fixing rollers 24 and ejected to the paper tray 25.

Also, at the time of the reader mode, the user can change the inclination angle of the screen surface in accordance with the user's position, the peripheral brightness or the like by rotating the knob 26, which enables the user to observe the screen with ease.

The screen 8 is inclined upwardly in FIG. 1 while inclined downwardly in FIG. 2.

The variable angle range for the screen 8 can be determined easily by changing the positions of stoppers (not illustrated).

Next, a second embodiment according to the present invention will be described.

There is a disadvantage in the first embodiment in that when the screen 8 is inclined upwardly, the screen surface reflects the external light such as the fluorescent light, whereby the user cannot see the projected image well.

Therefore, in this embodiment, the light amount of the lamp is increased for the user to observe the bright screen easily when the screen is inclined upwardly.

Figure 4:
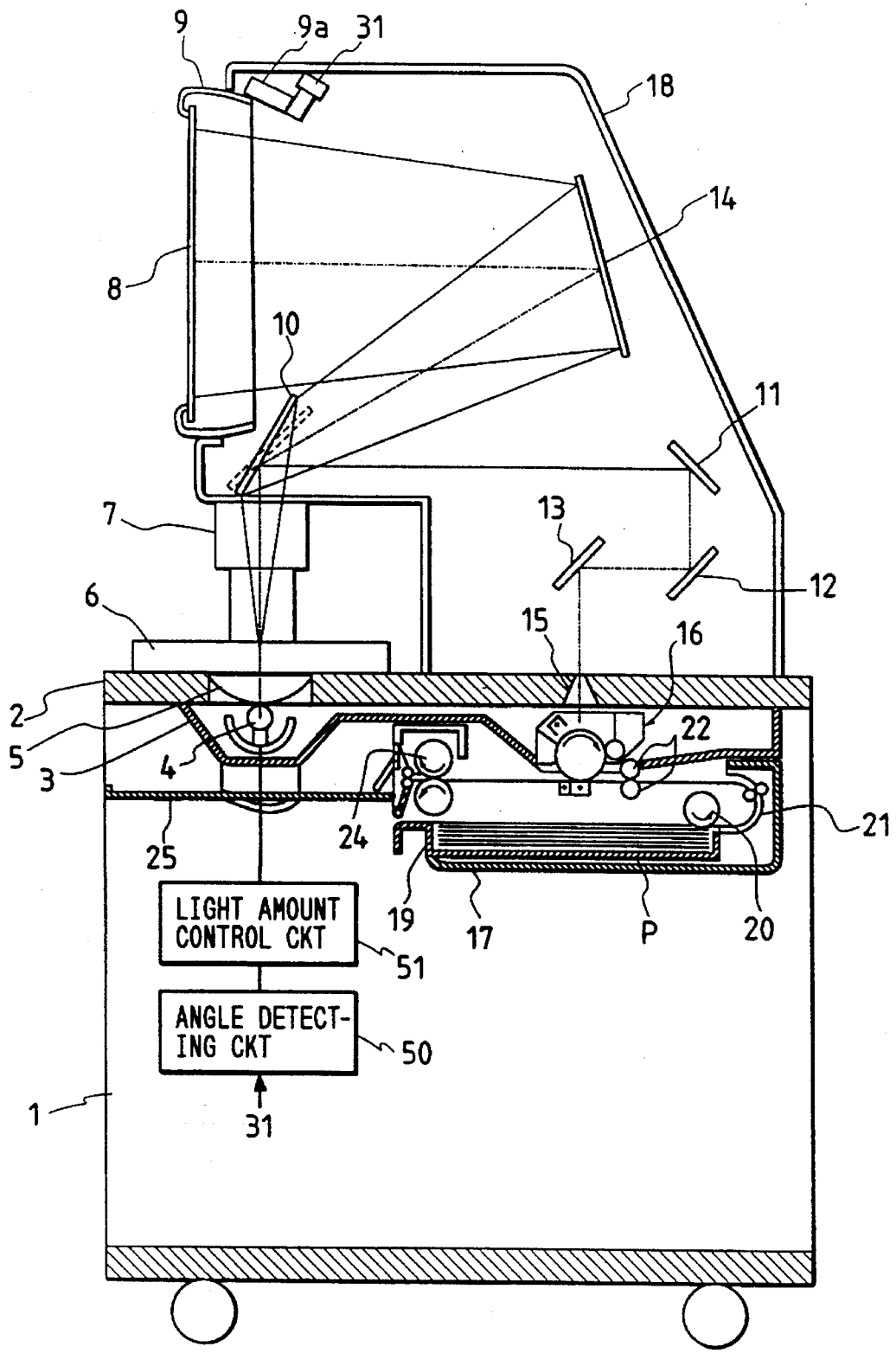
FIG. 4 is a schematic diagram of a microfilm reader printer of a second embodiment according to the present invention.

FIG. 4 is a sectional side view of a microfilm reader printer of the second embodiment and elements identical to those in the first embodiment are designated by the identical reference numerals. Only the content different from the first embodiment will be described.

In FIG. 4, a light-shielding plate 9a is provided on the screen frame 9. A reference numeral 31 is a photointerrupter for detecting the position of the light-shielding plate 9a.

The light-shielding plate 9a is rotated integrally with the screen frame 9 and the photointerrupter 31 detects the position of the rotated light-shielding plate 9a and outputs a signal corresponding to the position. The output signal of the photointerrupter 31 is supplied to an angle detecting circuit 50, wherein the inclination angle of the screen 8 is detected. The data of the inclination angle of the screen 8 detected in the angle detecting circuit 50 is sent to a light amount control circuit 51 by which the light amount of the lamp 4 is adjusted in accordance with the inclination angle of the screen 8.

As the screen 8 is inclined upwardly as illustrated in FIG. 1, the light amount control circuit 51 increases the light amount of the lamp 4 to brighten the screen surface to improve the contrast of the projected image. On the other hand, as the screen 8 is inclined downwardly as illustrated in FIG. 2, the light amount control circuit 51 decreases the light amount of the lamp 4 to darken the screen surface. Thus, the light amount of the lamp 4 is adjusted properly in accordance with the inclination angle of the screen 8 so as to be able to observe the projected image having a proper contrast at all times.

Next, a third embodiment according to the present invention will be described.

When the light amount is increased to observe the projected image on the screen surface with ease as in the second embodiment, there is a disadvantage that the power consumption becomes large and the lifetime of the lamp 4 is shortened.

Therefore, in this embodiment, when the screen is inclined upwardly, a light-shielding member is projected forwardly from an upper position of the screen to prevent the external light from being incident on the screen surface.

Figure 5:
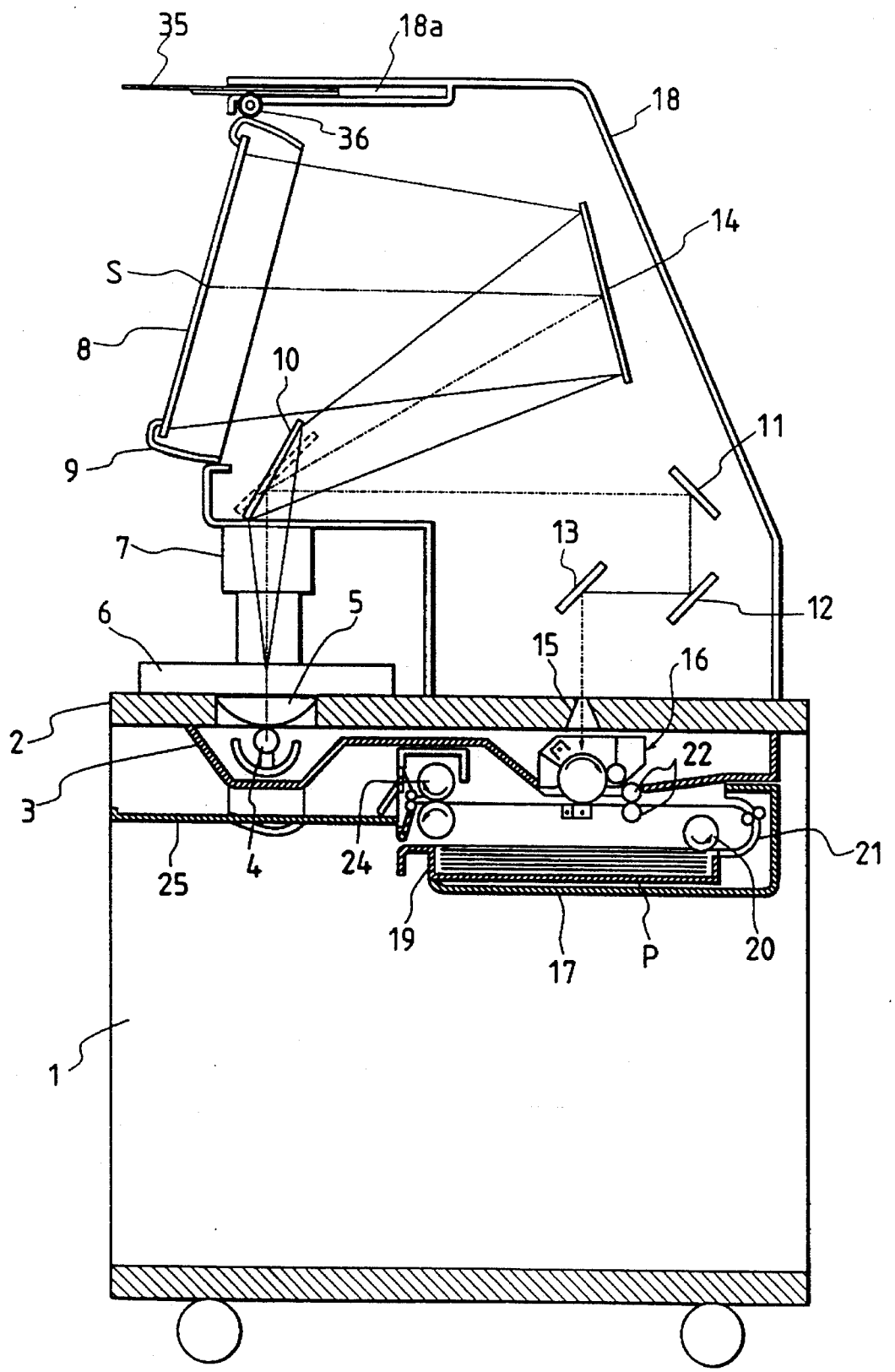
FIG. 5 is a schematic diagram of a microfilm reader printer of a third embodiment according to the present invention.
Figure 6:
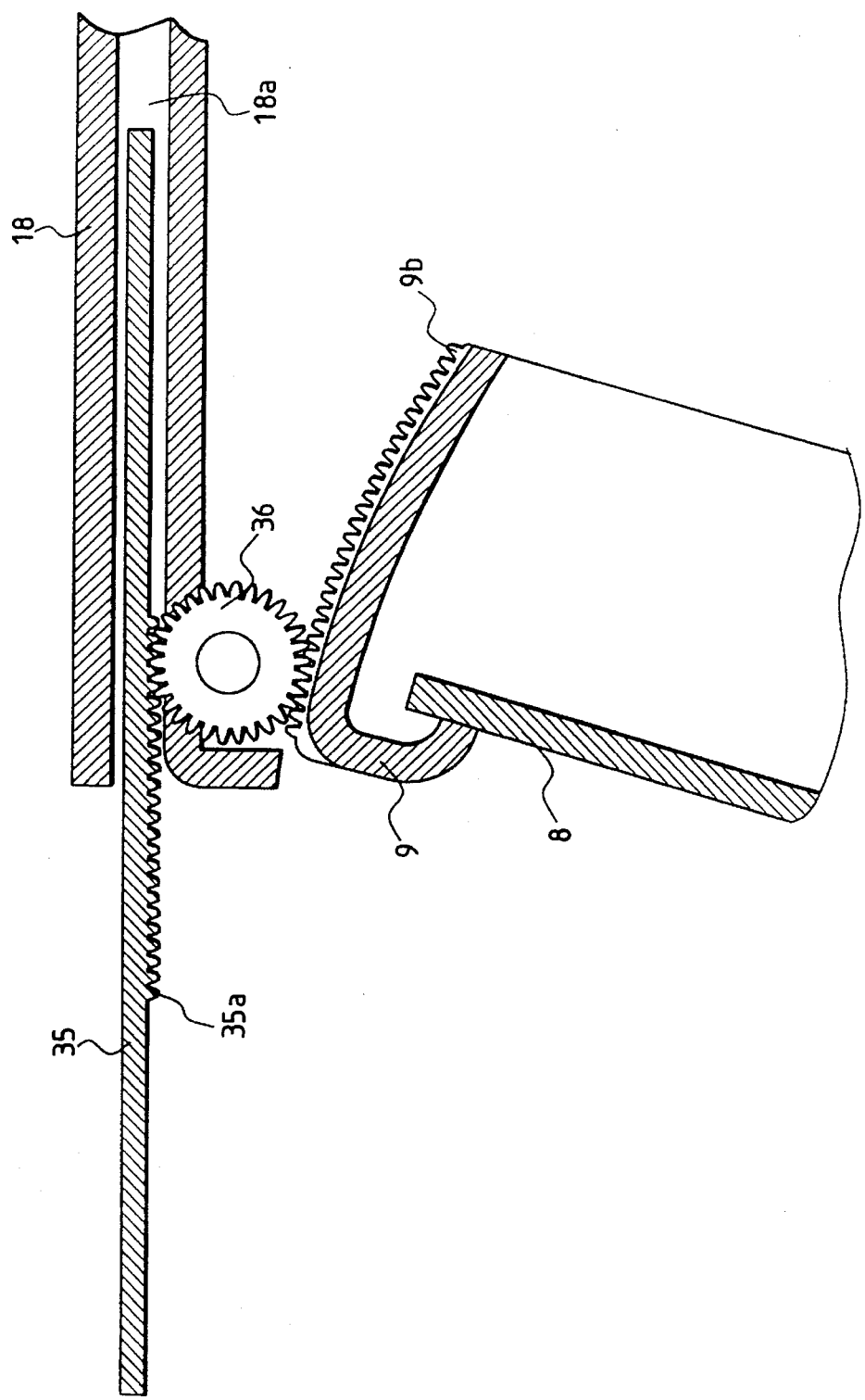
FIG. 6 is a partial cross section illustrating the interlocking mechanism of the microfilm reader printer of FIG. 5.

FIGS. 5 and 6 illustrate a microfilm reader printer of the third embodiment and elements identical to those in the foregoing embodiments are designated by the identical reference numerals. Only the content different from the foregoing embodiments will be described.

In FIGS. 5 and 6, a gear 9b is provided on the screen frame 9 and its center is a rotation center point S of the screen frame 9. A light-shielding member 35 is projected from or retracted in a groove 18a of the casing 18. A pinion gear 36 is engaged with the gear 9b of the screen frame 9 and also engaged with a rack 35a formed on the light-shielding member 35. Thereby, the light-shielding member 35 can be projected from or retracted in the groove 18a of the casing 18 in accordance with movement of the screen frame 9.

Accordingly, when the screen frame 9 is rotated clockwise, the light-shielding member 35 is projected from the casing 18 in accordance with the rotation of the screen frame 9.

On the other hand, when the screen frame 9 is rotated counterclockwise, the light-shielding member 35 is retracted in the casing 18 in accordance with the rotation of the screen frame 9.

Thus, even though the screen is inclined upwardly, it is easy to see the screen since the external light is prevented from being incident on the screen surface owing to the forwardly projected light-shielding member.

Although the light-shielding member is moved gradually in accordance with the rotation of the screen, it may be projected instantly when the screen surface is inclined upwardly over a predetermined angle and may be retracted instantly when the screen surface is inclined downwardly below the predetermined angle.

Now, a fourth embodiment according to the present invention will be described.

Figure 8:
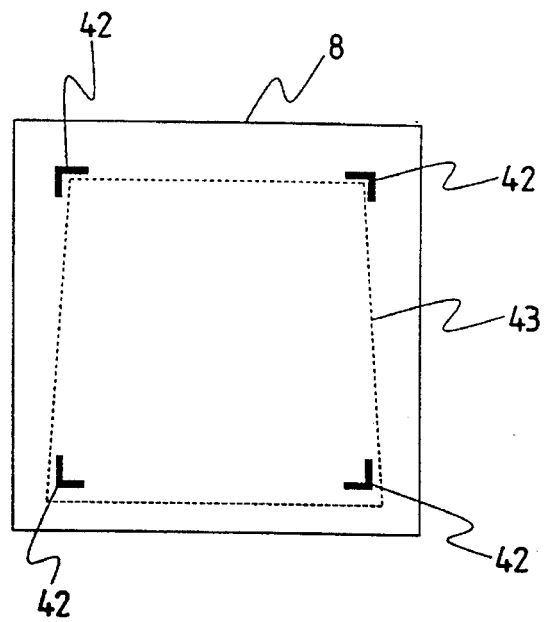
FIG. 8 is an explanatory diagram for explaining the projected image.

When the surface of the screen 8 is positioned so as not to be perpendicular with respect to the optical axis as illustrated in FIG. 1, the projection magnification is different in various areas of the screen to cause the projected image to be distorted. FIG. 8 illustrates the state of the distortion of the projected image at that time. Brackets 42 are indices for indicating a printing area. An area within the brackets 42 is an effective printing area for obtaining a printing image from a projected image when the screen surface is perpendicular to the optical axis. A numeral number 43 represents an effective printing area for obtaining a printing image from a projected image when the screen surface intersects the optical axis in the manner as illustrated in FIG. 1.

In the above embodiments, as the inclination angle of the screen surface is changed, the effective printing area of the projected image is changed, so that it is difficult for the user to distinguish the effective printing area precisely.

Then, in this embodiment, a member for indicating and projecting brackets to the screen is disposed on the projection optical light path of the original image frame of the microfiche and the distortion of the projected original frame image is made to coincide with that of the projected image of the brackets.

Figure 7:
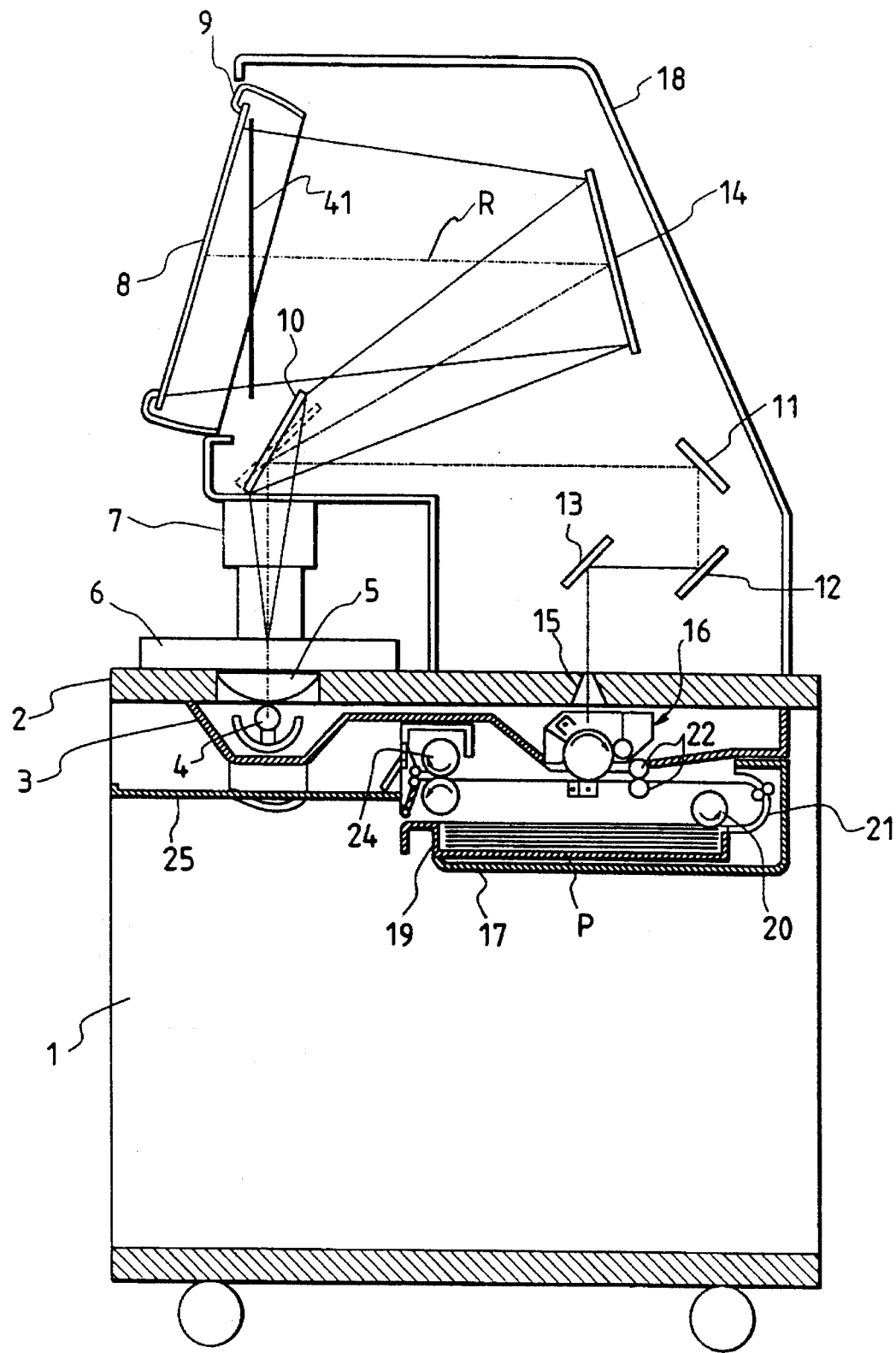
FIG. 7 is a schematic diagram of a microfilm reader printer of a fourth embodiment according to the present invention.

FIG. 7 is a sectional side view of a microfilm reader printer of the fourth embodiment and elements identical to those in the foregoing embodiments are designated by the identical numeral numbers. Only the content different from that in the foregoing embodiments will be described.

Figure 9:
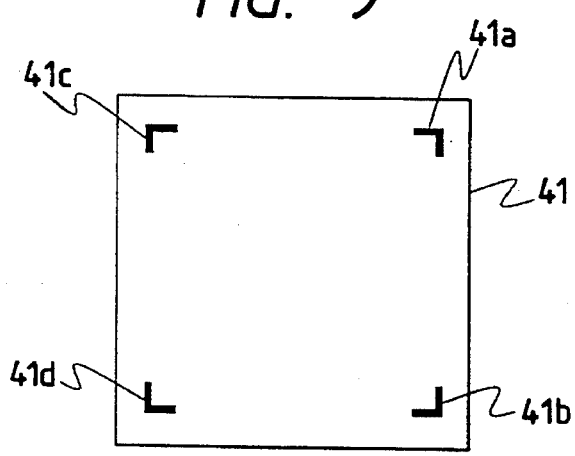
FIG. 9 is a front view of a display member.

In FIG. 7, a display member 41 is formed of a transparent material such as a film sheet, a glass or the like and disposed on a light path R of the projected image of the original image frame in the vicinity of the screen 8 so as to be perpendicular to the optical axis R. As illustrated in FIG. 9, the display member 41 is provided with nontransparent or semitransparent brackets 41a to 41d. An area within the brackets 41a to 41d of the display member 41 corresponds to an effective printing area for the projected image of the original image frame.

Figure 10:
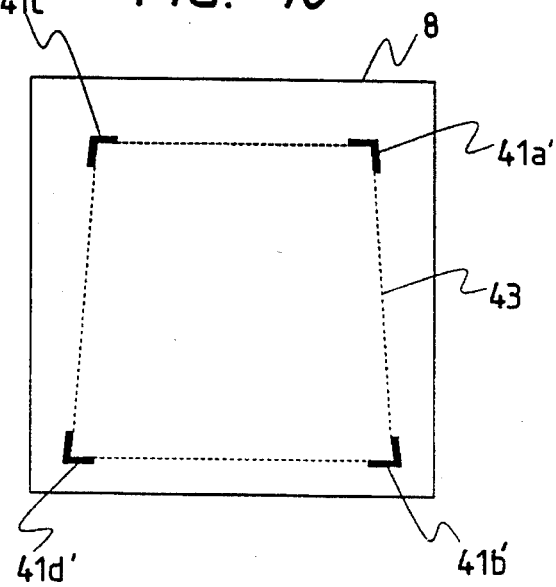
FIG. 10 is an explanatory diagram for explaining the state of the projected brackets.

Since the projected image of the original image frame and projected images 41a' to 41d' of the brackets 41a to 41d are projected compositely on the screen 8, the projected image of the original image frame and the projected images 41a' to 41d' have the same distortion, as illustrated in FIG. 10, even though the screen 8 is disposed so as not to be perpendicular to the optical axis R. Therefore, the user can easily ascertain the effective printing area 43 for the projected image of the original image frame due to the projected images 41a' to 41d'.

In this embodiment, the display member 41 is disposed in the vicinity of the screen 8, which is preferable to enhance the resolution of the brackets.

However, the position of the display member 41 may be changed by providing a light path for projecting the brackets independently of that for the original image frame.

Also, in this embodiment, the brackets disposed fixedly in the vicinity of the screen are projected, but brackets may be each moved in accordance with the distortion of the projected image of the original image frame. At that time, the brackets may be disposed on the screen or other places.

As described above, it is possible to set the screen to be perpendicular to the user's line of sight by changing the inclination angle of the screen surface, so that the user can see the screen easily.

Also, when the screen surface is inclined upwardly, the light amount is increased to prevent the external light from being reflected by the screen surface thereby to see the projected image well. Further, the light-shielding member is projected forwardly from the upper portion of the screen to prevent the external light from being incident on the screen surface, so the user can see the screen well.

Furthermore, as the projected image of the original image frame and the projected image of the brackets for indicating the effective printing area are compositely projected on the screen, the user can discriminate the effective printing area precisely even though the projected image of the original image frame is distorted.

Although the microfilm is utilized in the above embodiments, it is possible to utilize image carrying members such as a sheet for an OHP (overhead projector).

Figure 11:
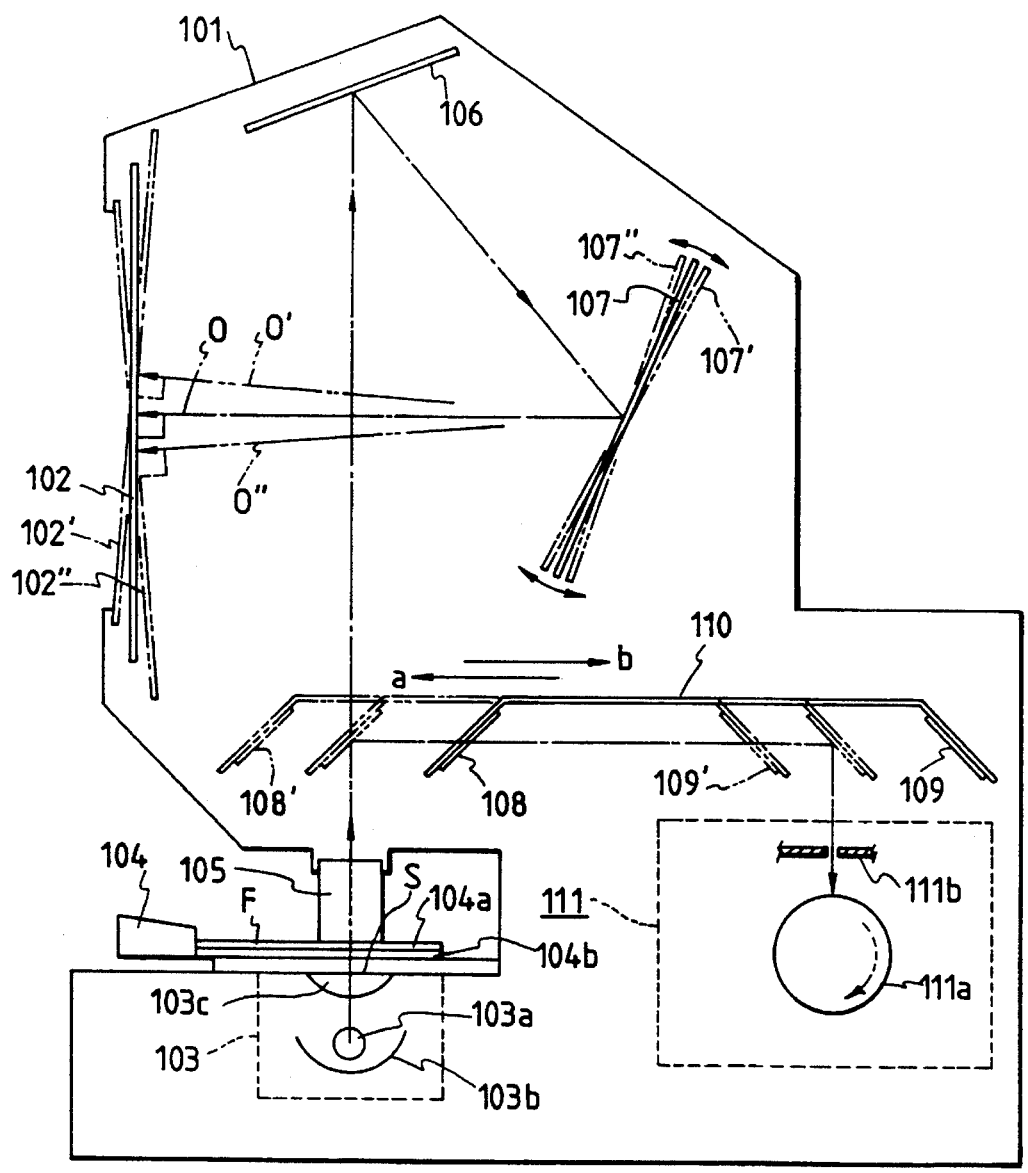
FIG. 11 is a schematic diagram of a microfilm reader printer of a fifth embodiment according to the present invention.

FIG. 11 is a schematic diagram illustrating a microfilm reader printer of a fifth embodiment according to the present invention.

The microfilm reader printer has a casing 101 and a transmission-type screen 102 (rear type) for the reader disposed on the front side of the casing 102.

An illuminating unit section 103 includes a light source lamp 103a, a spherical reflecting mirror 103b, a condenser lens 103c or the like.

A microfilm carrier 104 is provided over the illuminating unit section 103 and is a microfiche carrier but may be a roll film drive mechanism.

The carrier 104 has two upper and lower platen glasses 104a and 104b. A microfiche film F is sandwiched between the platen glasses 104a and 104b. A desired image frame of the microfiche film F is disposed at an illuminating position S by shifting the carrier 104 lengthwise and/or widthwise.

In the reader mode, light from the lamp 103a illuminates the image frame disposed at the illuminating position S. The light transmitting the image frame reaches the rear surface of the screen 102 via a projection optical system (for reader) formed of a projection lens 105, a first mirror 106 for the reader, a second mirror 107 for the reader and the screen 102 to project a magnified image of the image frame thereon. The projected magnified image can be observed outside the screen 102.

First and second movable scan mirrors 108 and 109 for a printer are held by a holding member 110 such that light from the lamp 103a is reflected perpendicularly by both the first and second mirrors 108 and 109. The holding member 110 is moved by a drive mechanism (not illustrated) in the left and right directions a and b reciprocatively.

A numeral number 111 is a printer section having, e.g., a transfer type electrophotographic processing mechanism. In FIG. 11, only a rotatable sensitive drum 111a and a slit exposure plate 111b of the electrophotographic processing mechanism are illustrated and a primary charger, a developing unit, transferring means, fixing means, paper feeding means thereof are omitted.

At the time of the reader mode, the holding member 110 is retained in a wait and stop condition at a forward motion starting position as a home position as indicated by a solid line on the right. In this condition, the first movable scan mirror 108 is positioned outside the light pass from the projection lens 105 to the first mirror 106 for the render and will not be a hindrance to the reader light path.

In the printer mode, the holding member 110, i.e., the first and second movable scan mirrors 108, 109 are driven forwardly (back scan) in the left direction a from the home position, during which the first movable scan mirror 108 intersects the reader light path from the projection lens 105 to the first mirror 106 for the reader.

After the first and second movable scan mirrors 108, 109 reach forward end points 108', 109' (exposure start points), the drive of the holding member 110, i.e., the first and second movable scan mirrors 108, 109 is switched to the backward drive. During the backward drive, the light from the projection lens 105 is scanned by the first movable scan mirror 108. The scanned light is reflected by the second movable scan mirror 109 to pass a slit formed in the slit exposure plate 111b to reach the rotatable sensitive drum 111a on a surface of which then an image is formed.

That is, the image information of the image frame of the microfiche film F on the lighting position is exposed on the surface of the sensitive drum 111a through the slit. Thus, the printing process is started.

At the time of printing, the sensitive drum 111a is rotated clockwise as indicated by an arrow at a constant peripheral speed while the holding member 110, i.e., the first and second movable scan mirrors 108, 109 are shifted at a half speed of the peripheral speed of the sensitive drum 111a. After the exposure, the holding member 110 is returned to the initial home position as indicated by the solid line, wherein the first movable scan mirror 108 is out of the reader light pass.

In this embodiment, the screen 102 can be freely inclined upwardly or downwardly as indicated by the two-dot-chain lines in FIG. 11 from the upright condition by a mechanism (see FIG. 12A) to be described later. Then, the inclination angle of the screen can be adjusted such that the user's line of sight becomes perpendicular to the screen surface for easy observation or the external light reflected by the screen surface is prevented from entering the user's eyes.

At this time, the second mirror 107 for the reader is moved or rotated to, e.g., positions 107, 107', 107" in accordance with the rotating movement of the screen 102 such that the screen surface is always kept approximately perpendicular to an optical axis 0, 0' or 0" of the projection optical system directed to the screen surface in spite of positions 102, 102', 102" of the screen 102.

Figure 12A:
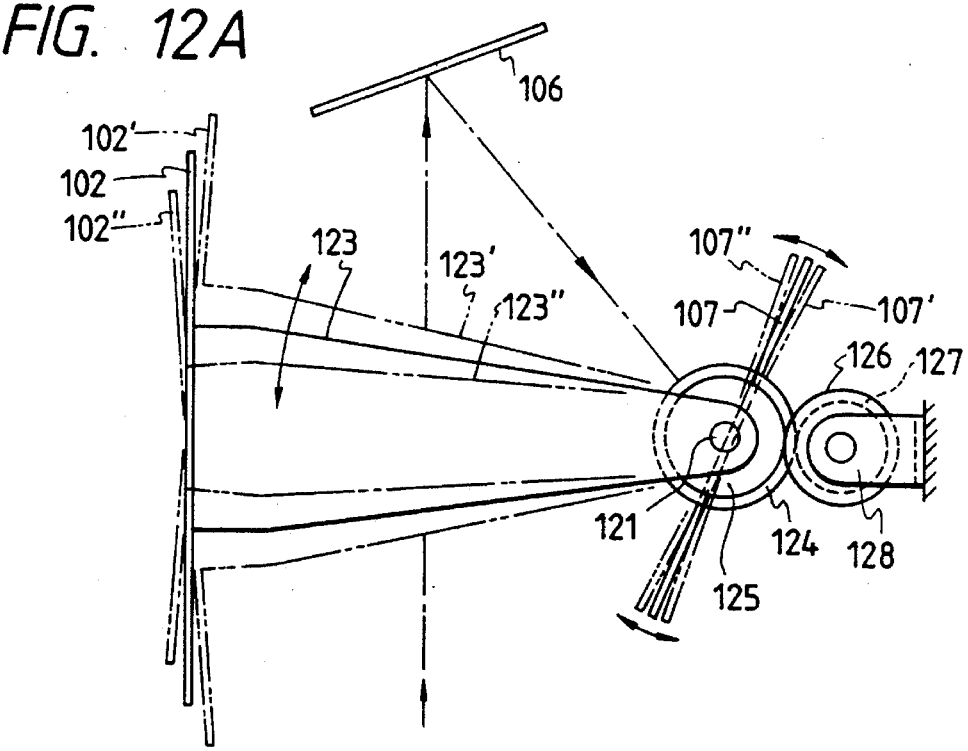
FIG. 12A is a side view of an interlocking mechanism of the screen and the first mirror for the reader of the fifth embodiment.
Figure 12B:
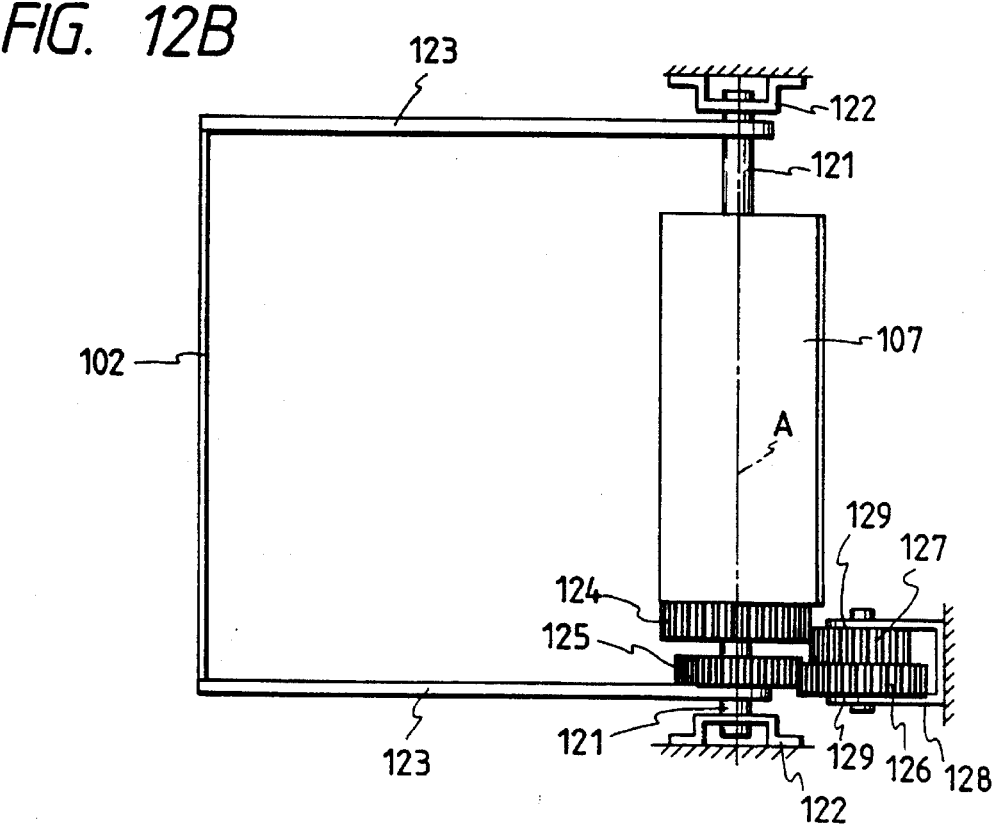
FIG. 12B is a plan view of FIG. 12A.

FIG. 12A is a side view of an interlocking mechanism of the screen 102 and the second mirror 107 in this embodiment and FIG. 12B is a plan view thereof.

Axle pins 121 are provided on both lateral ends of the second mirror 107 so as to project therefrom. The axle pins 121 are received and supported rotatably by bearing plates 122 secured to stationary members provided on the apparatus body. Therefore, the second mirror 107 is rotatable around the axle pins 121 between the bearing plates 122.

The axle pins 121 are provided with a horizontal line A as the center, the horizontal line A passing the intersecting point of the optical axis and the reflection surface of the second mirror 107 and being within the reflection surface of the mirror 107.

A pair of screen levers 123 are formed on lateral sides of the screen 102 integrally with the screen 102 and are parallel to each other. The levers 123 are extended toward the inside of the apparatus.

Ends of the levers 123 on the opposite side to the side of the screen 102 are formed with holes in which the respective axle pins 121 are fitted, whereby the levers 123 are moved freely upwardly and downwardly around the axle pins 121. That is, the screen 102 is connected via the levers 123 to the axle pins 121 so as to rotate upwardly or downwardly around the axle pins 121.

A mirror gear 124 is provided concentrically and integrally on one of the axle pins 121 and integrated to the second mirror 107. A screen lever gear 125 is concentrically and rotatably fitted on the axle pins 121 to face the mirror gear 124 and integrally formed with the inside surface of the screen lever 123. Double gears 126 and 127 are concentric with each other and received and supported by a bearing plate 128 secured to a stationary member of the apparatus body.

The gear 126 is engaged with the screen lever gear 125 while the gear 127 is engaged with the mirror gear 124.

Friction members 129 are provided in gaps between the side ends of the double gears 126, 127 and the bearing plate 128 so as to impart resistance to the rotation of the double gears 126, 127.

The gear ratio of the screen lever gear 125 to the gear 126 is as follows:

gear 125: gear 126=1:1

The gear ratio of the mirror gear 124 to the gear 127 is as follows:

gear 124: gear 127=2:1

When the screen 102 is rotated upwardly or downwardly around the axle pins 121 against the friction resistance of the friction members 129 to the position 102, 102' or 102" by operating a knob (not illustrated) formed integrally with the screen 102 or the screen lever 123, the second mirror 107 is correspondingly rotated around the axle pins 121 via the screen lever gear 125, the one gear 126 of the double gears, the other gear 127, the mirror gear 124, the axle pin 121 to the position 107, 107' or 107'.

Even though the user releases his hand from the knob after the screen 102 is rotated upwardly or downwardly to a certain position, the friction resistance of the friction members 129 surpasses downward rotation moment of the levers 123 due to the weight of the screen 102 thereby to prevent the gears from rotating spontaneously.

When the screen 102 needs to be inclined further upwardly from the present position, the screen 102 is rotated around the axle pins 121 clockwise in FIG. 12A by the knob, whereby the screen lever gear 125 is integrally rotated around the axle pin 121 clockwise.

At this time, when the displacement angle is assumed to be θ and the gear 125 is rotated clockwise at the angle θ, the one gear 126 of the double gears whose gear ratio with respect to the gear 125 is 1:1 and the other concentric gear 127 are rotated together at the angle θ.

Then, the mirror gear 124 whose gear ratio with respect to the gear 127 is 2:1 and the second mirror 107 formed integrally with the gear 124 are rotated around the axle pins 121 clockwise at the angle θ/2 correspondingly.

Also, when the screen 102 needs to be inclined further downwardly from the present position, the screen 102 is rotated around the axle pins 121 counterclockwise in FIG. 12A by the knob. At this time, the second mirror 107 is rotated around the axle pins 121 counterclockwise at the angle θ/2 by means of the opposite operation to the above.

Thus, when the displacement angle ratio of the screen 102 to the second mirror 107 is 2:1, from the optical rule, the optical axis 0, 0' or 0" of the projection optical system directed from the second mirror 107 to the screen 102 is always perpendicular to the screen surface in spite of the position 102, 102' or 102" of the screen 102 (see FIG. 11).

As a result, even though the inclination angle of the screen 102 is changed so as to be suitable for the user's line of sight or to prevent the external light reflected by the screen surface from entering the user's eyes, no distortion or blur occurs in the projected image on the screen surface.

Also, as the second mirror 107 is moved together With the screen 102 correspondingly, no influence is exerted on the printer system and there is no need to return the mirror or the like to the initial position.

Figure 13A:
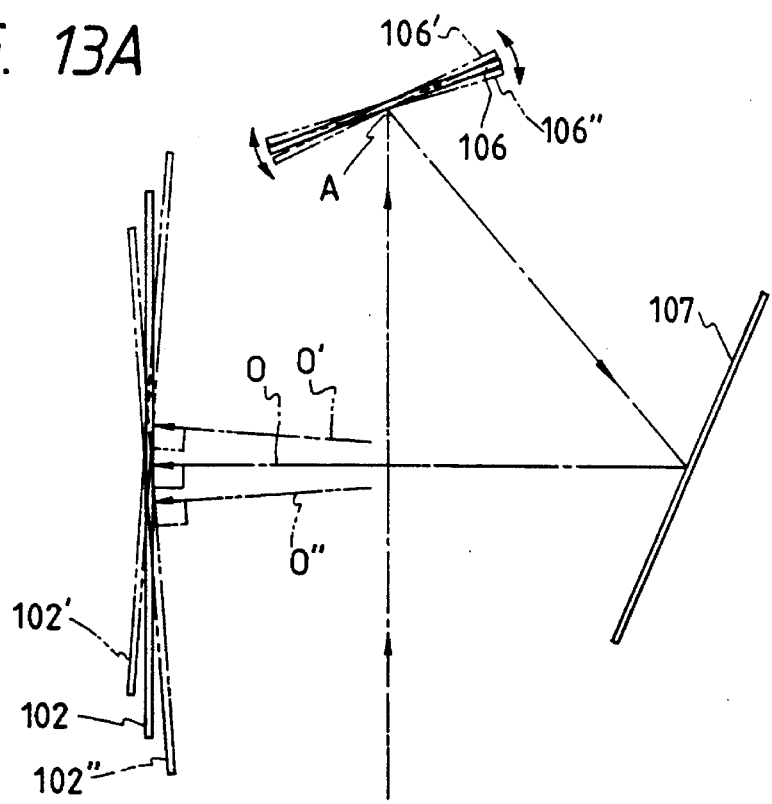
FIG. 13A is a schematic view illustrating an interlocking relationship of a screen and a first mirror of a sixth embodiment according to the present invention.
Figure 13B:
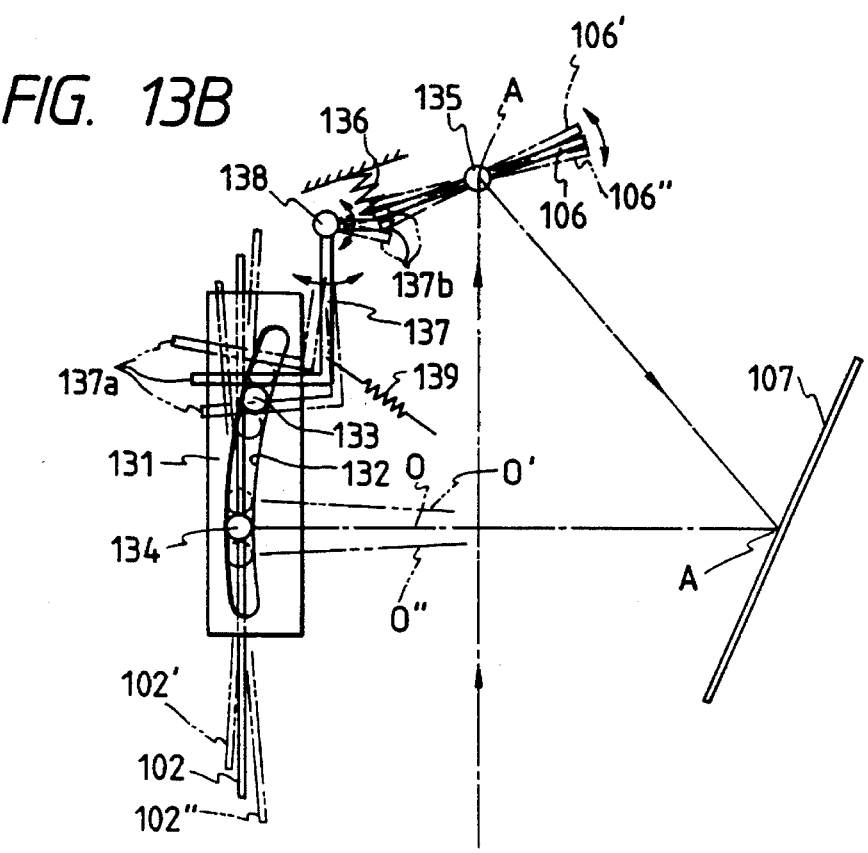
FIG. 13B is a schematic view of the interlocking mechanism of the sixth embodiment.

FIGS. 13A and 13B illustrate a sixth embodiment according to the present invention.

In this embodiment, the first mirror 106 of the projection optical system for the reader is moved to, e.g., a position 106, 106' or 106" in accordance with the change of the inclination angle of the screen 102, i.e., the position 102, 102' or 102" of the screen 102. The second mirror 107 is secured stationarily at a predetermined angle.

FIG. 13B illustrates an interlocking mechanism of the screen 102 and the first mirror 106.

A pair of cam hole plates 131 are provided fixedly on the apparatus body on the lateral sides of the screen 102. The cam hole plates 131 are formed with respective arcuate guide cam holes 132 symmetrically with the horizontal line A within the reflection surface of the second mirror 107 as the center.

Guide pins 33 and 34 are formed on the lateral sides integrally with the screen 102 so as to project outwardly. The guide pins 33 and 34 are fitted in the respective arcuate guide cam holes 32 of the cam hole plates 31. The screen 102 is rotatable around the horizontal line A within the reflection surface of the second mirror 107 owing to the arcuate guide cam holes 32 and the guide pins 133 and 134.

The screen 102 is inclined upwardly or downwardly to be in the position 102, 102' or 102" by the operation of the knob (not illustrated) formed integrally with the screen 102 and retained in the position 102, 102' or 102" securely as the friction members (not illustrated) prevent downward rotation of the screen 2 caused by its own weight.

The first mirror 106 is freely rotatable around a horizontal line A within the reflection surface thereof. A numeral number 135 is a central axis of its rotation and provided with the horizontal line A as the center, the horizontal line A passing the intersecting point of the reflection surface of the first mirror 106 and the optical axis and being within the reflection surface of the mirror 106.

The mechanisms provided on both the lateral sides of the screen 2 for rotating the screen 102 and the first mirror 106 are the same, so the mechanism on the one side thereof will be described hereinafter.

A spring 136 urges the mirror 106 constantly counterclockwise around the axis 135. A lever 137 is rotatable around a pivot 138 and urged constantly counterclockwise by a spring 139. One arm 137a of the lever 137 is in contact with the upper guide pin 133 of the screen 102 while the other arm 137b is in contact with the first mirror 106.

When the screen 102 is inclined further upwardly from the present condition by the knob, the guide pins 133, 134 are pushed up in the guide cam hole 132, which causes the arm 137a of the lever 137 to be pushed up by the guide pin 133. Thereby, the lever 137 is rotated around the pivot 138 clockwise against the force of the spring 139. At this time, the other arm 137b of the lever 137 is rotated downwardly to cause the first mirror 106 to rotate around the axis 135 counterclockwise by the force of the spring 136.

That is, the first mirror 106 is rotated counterclockwise in accordance with the upward movement of the screen 102, so that the optical axis 0, 0' or 0" of the projection optical axis directed from the second mirror 107 to the surface of the screen 102 is constantly kept perpendicular to the surface of the screen 102 in spite of the change of the inclination angle of the screen 102 due to the upward inclination of the screen 102.

When the screen 102 is inclined further downwardly from the present position by the knob, the guide pins 133, 134 are lowered in the guide cam hole 132. At this time, as the arm 137a of the lever 137 presses the guide pin 133 constantly by means of the spring 139, the other arm 137a of the lever 137 is rotated downwardly. Thereby, the lever 137 is rotated around the pivot 138 counterclockwise to cause the arm 137b of the lever 137 to be raised. As a result, the mirror 106 is rotated clockwise around the axis 135 against the force of the spring 136.

That is, the first mirror 106 is rotated clockwise in accordance with the upward movement of the screen 102, so the optical axis 0, 0' or 0" of the projection optical system directed from the second mirror 107 to the surface of the screen 102 is constantly kept perpendicular to the surface of the screen 102 in spite of the change of the inclination angle of the surface of the screen 102 due to the upward movement thereof.

Therefore, even though the inclination angle of the screen 102 is changed so as to be suitable for the user's line of sight or to prevent the external light reflected by the screen surface from entering the user's eyes, no distortion or blur occurs in the projected image of the screen surface.

Because the mirror of the projection optical system to be moved together with the screen 102 is the first mirror 106 close to the screen 102 in this embodiment, it is advantageous that its interlocking mechanism is more compact than that in the fifth embodiment.

Figure 14:
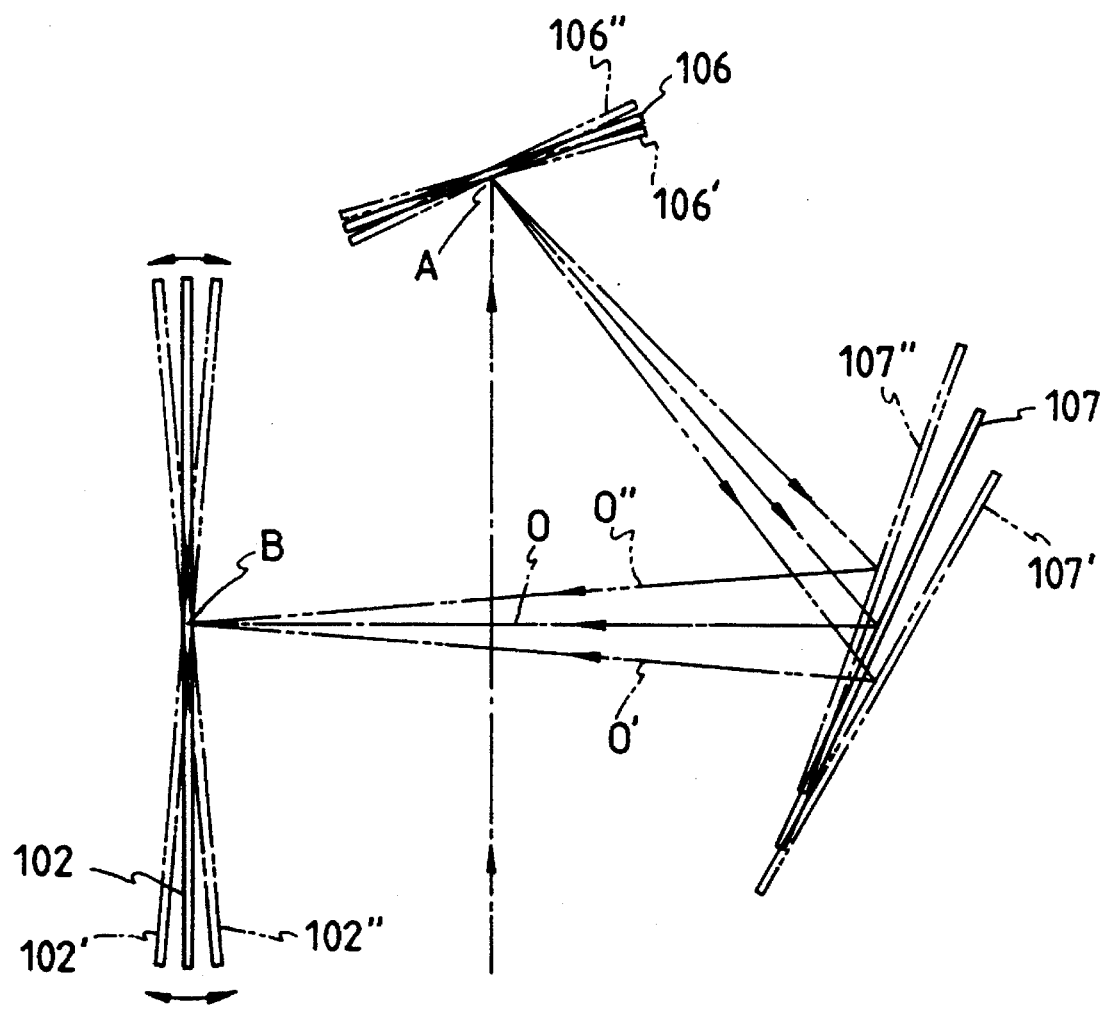
FIG. 14 is a schematic view illustrating an interlocking relationship of a screen and a first mirror of a seventh embodiment according to the present invention.

FIG. 14 illustrates a seventh embodiment of the present invention. In this embodiment, in order to keep the optical axis 0, 0' or 0" of the projection optical system directed from the second mirror 107 to the surface of the screen 102 constantly perpendicular to the surface of the screen 102 in spite of the change of the inclination angle of the screen 102, i.e., the position 102, 102' or 102" of the screen 102, both the first mirror 106 and the second mirror 107 are moved to, e.g., the position 106,106' or 106" and the position 107, 107' or 107" respectively in accordance with the change of the inclination angle of the screen 102.

In this embodiment, the screen 102 is rotatable around the central horizontal line B to be in the position 102, 102' or 102".

The first mirror 106 is rotatable around the horizontal line A within the reflection surface of the mirror 106 to be in the position 106, 106' or 106" in a similar manner to the sixth embodiment.

Also, the second mirror 107 is rotatable around the horizontal line B of the screen 102 to be in the position 107, 107' or 107" in a manner opposite to the relationship between the screen 102 and the second mirror 107 in the fifth embodiment.

The interlocking mechanism of the screen 102 and the first and second mirrors 106, 107 is omitted in FIG. 14, but can be structured by combining the interlocking mechanisms in the fifth and sixth embodiments.

Even though the inclination angle of the screen 102 is changed so as to be suitable for the user's line of sight or to prevent the external light reflected by the screen surface from entering the user's eyes also in this embodiment, no distortion or blur occurs in the projected image of the screen surface also in this embodiment.

In this embodiment, since the screen 102 is moved around the horizontal line B, there is no need to change the visual point. Also, there is no need to provide an extra space for the screen 2 to move upwardly or downwardly and thus the apparatus can be formed to be more compact.

In the fifth to seventh embodiments, after the screen 102 is inclined by the user, the second mirror 107, the first mirror 106 or both the first and second mirrors 106, 107 are inclined. However, conversely, the mirror may be first inclined, and then the screen is inclined in accordance with the movement of the mirror.

Also, after making electrical detecting means detect the inclination of the screen, the mirror may be inclined by driving electrical drive means such as a monitor based on the detected data.

Further, by inputting the inclination angle of the screen from an operating section, the screen and the mirror may be moved correspondingly by means of electrical drive means.

In the image projecting apparatus according to the present invention, as described above, the screen is inclinable, and then the inclination angle of the screen surface can be adjusted for the user to see the projected image of the screen surface easily such that the user's line of sight is perpendicular to the projected image or the external light reflected by the screen surface is prevented from entering the user's eyes.

In this case, in spite of the change of the inclination angle of the screen, the screen and the mirror in the projection optical system are moved correspondingly such that the optical axis of the projection optical system directed to the screen surface is constantly kept approximately perpendicular to the screen surface, so that no distortion or blur occurs in the projected image on the screen surface.

FIGS. 15 to 21 illustrate an eighth embodiment according to the present invention.

Figure 16:
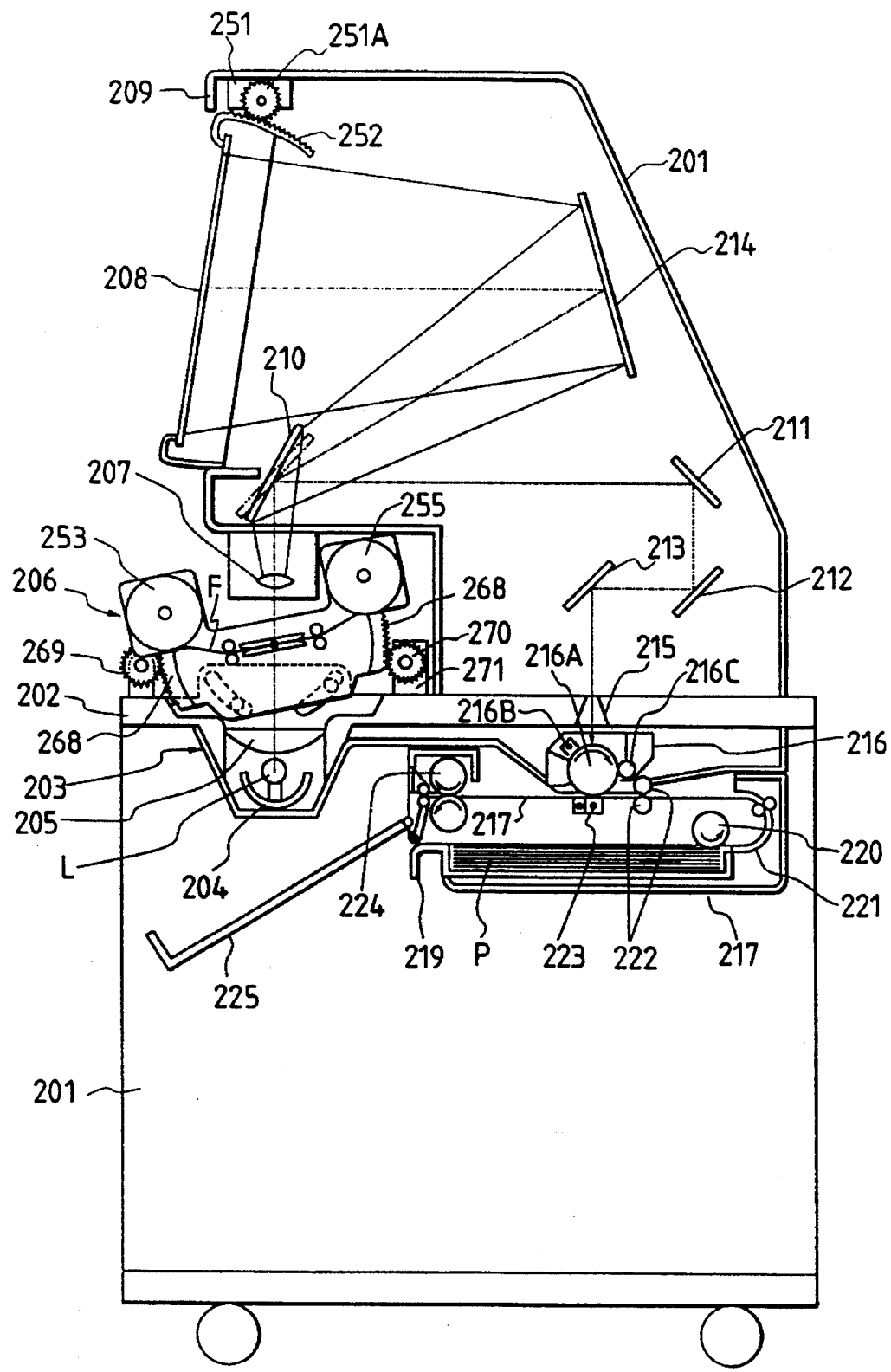
FIG. 16 is a schematic diagram of a microfilm reader printer of the eighth embodiment.

FIG. 16 is a schematic diagram of a microfilm reader printer embodying the image projecting apparatus of the present invention.

The microfilm reader printer has a lower casing 201 and an approximately horizontal table 202 on the lower casing 201.

Under the table 202 is a film illuminating unit section 203 that includes a light source lamp L, a spherical reflection mirror 204 and a condenser lens 205.

A microfilm carrier 206 for supporting a microfilm F is disposed movably on the table 202. The microfilm carrier 206 is a roll microfilm carrier in this embodiment, but may be a microfiche carrier.

An image forming lens 207 is for projecting an image of the microfilm F illuminated by the lamp L.

On the table 202 is provided an upper casing 218 having a screen 208, a screen frame 209 for holding the screen 208 and mirrors 210 to 214. The screen frame 209 is rotatable upwardly or downwardly with respect to the casing 218 by rotating a knob 226 (see FIG. 18) which is secured to the screen frame 209 and supported rotatably by the casing 218. That is, the screen 208 is rotated upwardly or downwardly via the screen frame 208 by rotating the knob 228, whereby the inclination angle of the screen surface can be changed. The knob 226 is provided rotatably in the bearing of the casing 218. When the rotation of the knob 226 is stopped, the rotation of the screen frame 209 is stopped, causing the screen 208 to be retained in a predetermined position.

Also, a slit 215 for printing is formed in the table 202 under the mirror 213. Under the slit 215 is provided a process cartridge 216 as a printer section. The process cartridge 216 contains a sensitive drum 216A, a charger 216B, a developing unit 216C, a cleaning unit or the like therein. The process cartridge 216 is removable with respect to the lower casing 201.

Under the process cartridge 216 is provided a paper feeding section 217 which is provided with a removable paper cassette 219 containing transfer papers P as well as a paper feeding roller 20, a U-shaped feeding passage 221, a pair of resist rollers 222, a transfer charger 223 and fixing rollers 224. Also, a paper tray 225 is provided under the lighting unit section 203 on the side of the exit of the paper feeding section 217.

In the reader mode, a desired image frame in the microfilm F (not illustrated) set to the microfilm carrier 206 is positioned over the condenser lens 25.

The lamp L illuminates the image frame from under. The light transmitted through the image frame is reflected by the mirrors 210, 214 via the image-forming lens 207 to project enlarged image information of the image frame. The projected image can be observed outside the screen 208.

In the print mode, upon depression of a copy key (not illustrated), incident light from the image-forming lens 207 to the upper casing 218 is sequentially reflected by the mirrors 210, 211, 212, 213 in the casing 218 to reach the sensitive drum 216A through the slit 215, wherein an enlarged image of the image information of the image frame is projected (slit scan exposure).

On the other hand, the transfer paper P is fed through the U-shaped feeding passage 221 under the process cartridge 216 in synchronism with the above operation and the image frame is transferred. Thereafter, the transfer paper P with the transferred image is subjected to a fixing process via the fixing rollers 224 and ejected to the paper tray 225.

Figure 19:
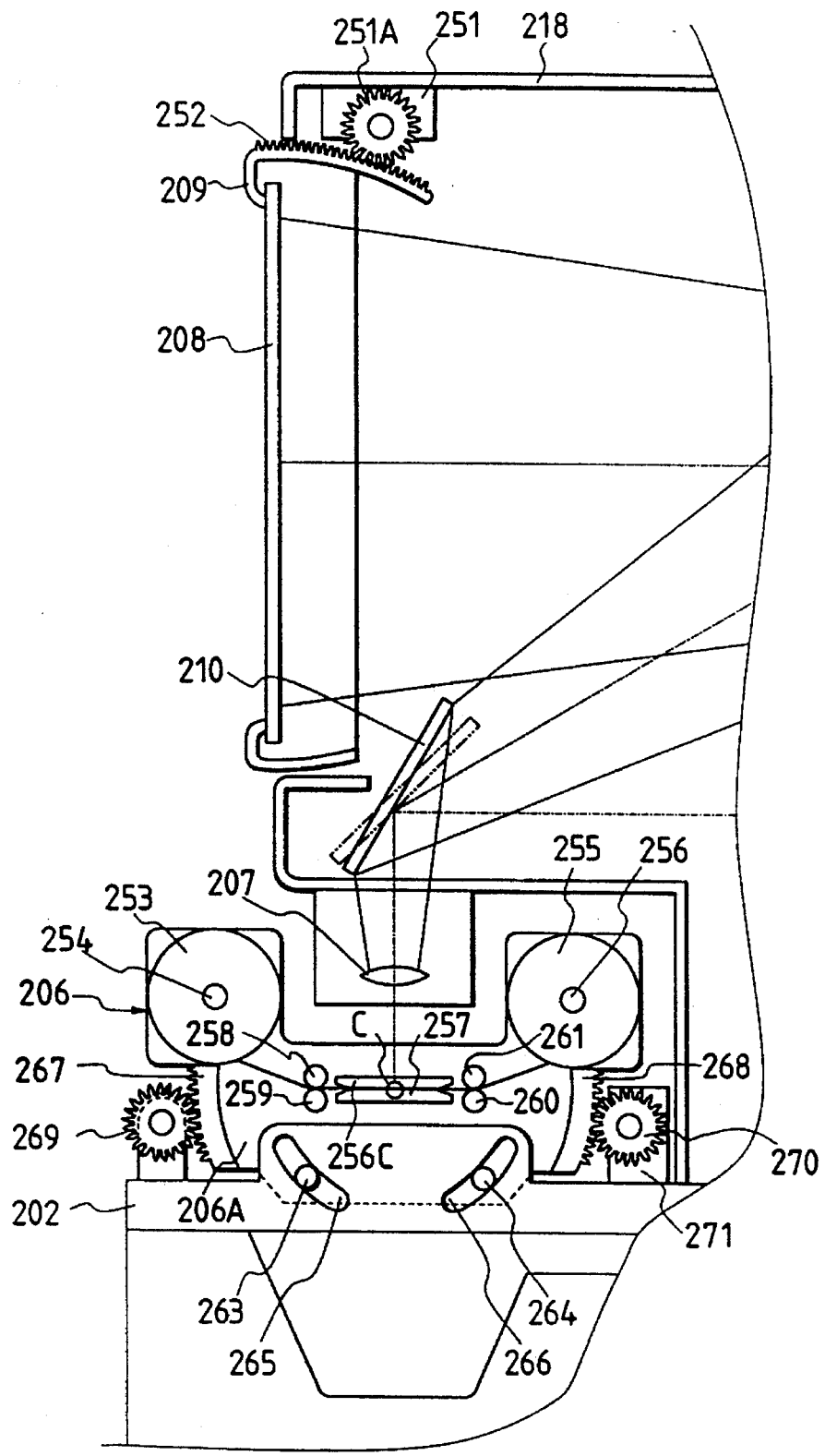
FIG. 19 is a schematic diagram of the essential portion of the microfilm reader printer of the eighth embodiment.

FIG. 19 illustrates a mechanism for detecting the inclination angles of the screen surface and the surface of the microfilm. F disposed at the lighting position.

Figure 20:
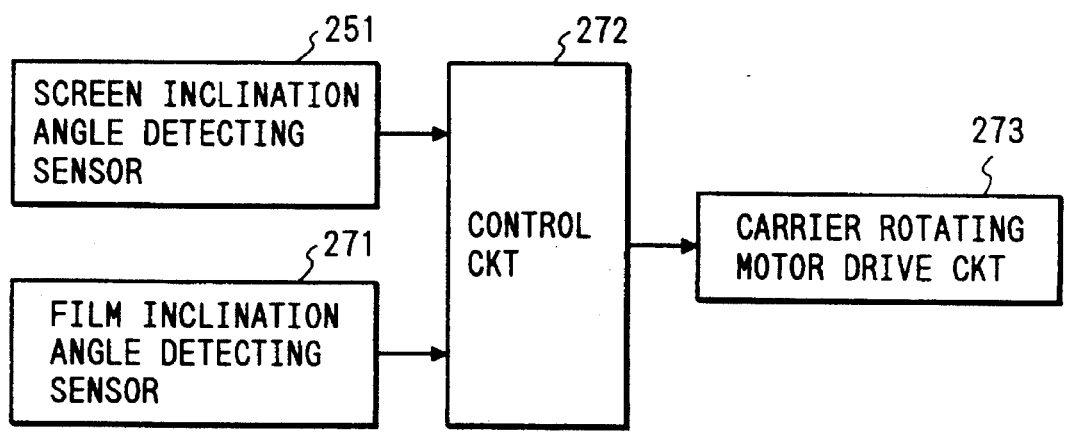
FIG. 20 is a block diagram illustrating the control circuit of the eighth embodiment.

A screen inclination angle detecting sensor 251 is disposed in the vicinity of the upper end of the screen 208 of the outer casing 218 to detect the inclination angle of the screen surface. The sensor 251 has a gear 251A which is engaged with a rack 252 provided on the upper portion of the screen frame 209. As the screen 208 is rotated upwardly or downwardly in accordance with the rotation of the knob 226, the gear 251A is rotated by the rack 252. The sensor 251 detects the inclination angle of the screen surface by detecting the amount and direction of the rotation of the gear 251A from a reference position. The detected inclination angle data is sent to a control circuit 272 as illustrated in FIG. 20.

In FIG. 19, the microfilm carrier 206 includes of a film supply reel 253, a drive shaft 254 for rotating the film supply reel 253, a film take-up reel 255, a drive shaft 256 for rotating the film take-up reel 255, film guide rollers 258 to 261, a pair of pressure plates 256, 257 formed of transparent glass for flatly holding the film F disposed at the illuminating position and a film guide plate (not illustrated). The film F can be moved forward or backward between the reels 253 and 255 by rotating the drive shaft 253 or the drive shaft 255 by means of a motor (not illustrated).

A main body 206A of the film carrier 206 is disposed on the table 202 so as to be rotatable in the same direction as the screen surface. A pair of pins 263, 264 are mounted fixedly to a side of the main body 206A and fitted in respective arcuate guide holes 265, 266.

The guide holes 265, 266 are arcs with an intersecting point C of a film surface at the illuminating position and the optical axis of the lamp L and the projection light path as the center. When the film carrier 206 is rotated upwardly or downwardly in a similar manner to the screen surface, the pins 263, 264 are slid along the arcuate guide holes 265, 266 and the film carrier 206 is rotated around the point C.

Both ends of the main body 206A are provided with respective racks 267, 268.

The racks 267, 268 are engaged with respective gears 269, 270 mounted on the table 202. When the drive gear 269 is rotated by a carrier rotating motor (not illustrated), the film carrier 206 is rotated via the rack 267.

The gear 270 constitutes a film inclination angle detecting sensor 271 for detecting the inclination angle of an area of the microfilm F held by the film carrier 206 at the illuminating position (film between the pressure plates 256, 257).

The sensor 271 detects the inclination angle of the surface of the film disposed at the illuminating position by detecting the amount and direction of rotation of the gear 270 from a reference position. The detected inclination angle data of the film surface is sent to a control circuit 272 as illustrated in FIG. 20.

The drive gear 269 is rotated by the carrier rotating motor in accordance with the inclination angle of the screen surface.

FIG. 20 is a block diagram of the control circuit for controlling the inclination angle of the film carrier 206.

The screen inclination angle data detected by the screen inclination angle detecting sensor 251 and the film inclination angle data detected by the film inclination angle detecting sensor 271 are sent to the control circuit 272, which compares two data and drives the carrier rotating motor via a carrier rotating motor drive circuit 273 to rotate the film carrier 206 such that the surface of the film disposed at the illuminating position is inclined at a predetermined inclination angle in accordance with the inclination angle of the screen surface.

Figure 15:
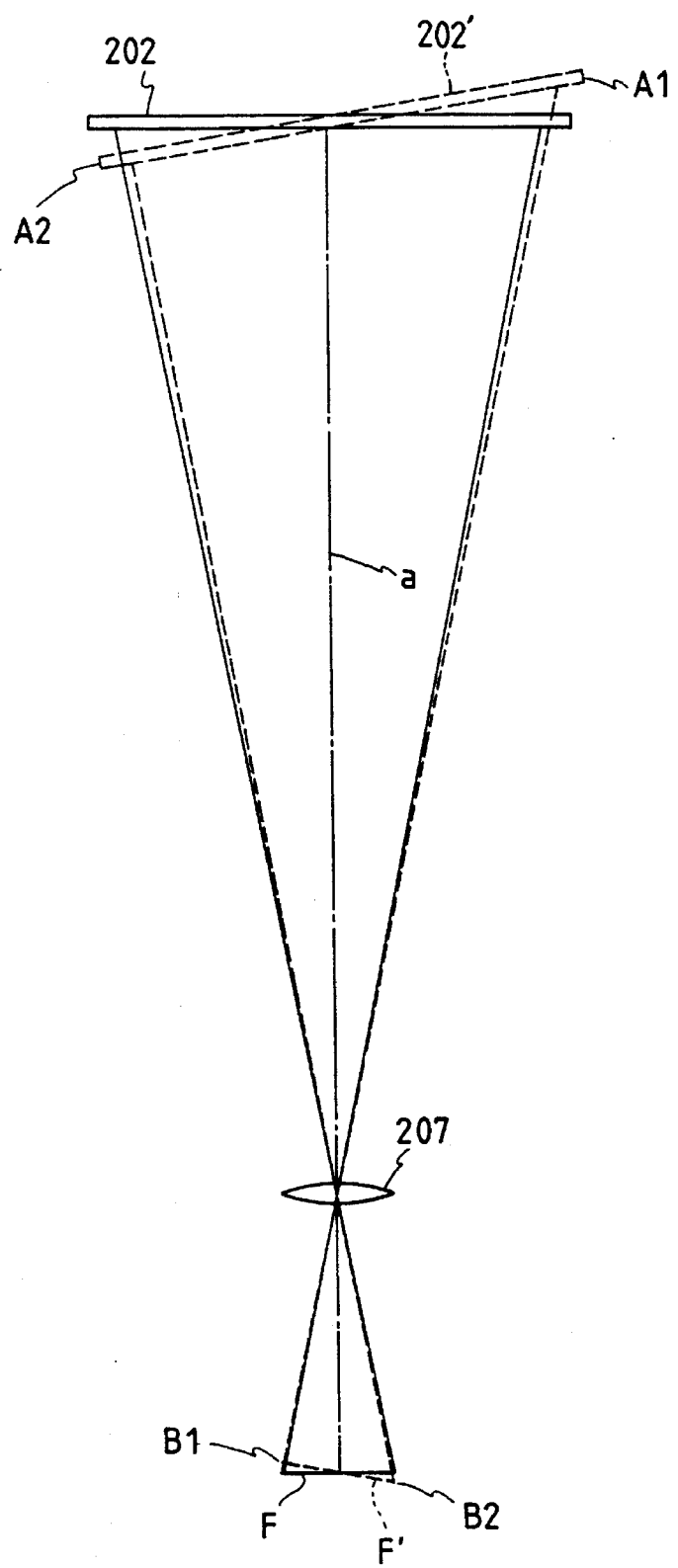
FIG. 15 is an explanatory diagram for explaining the rotational relationship between a screen surface and a film surface of an eighth embodiment according to the present invention.

FIG. 15 illustrates a relationship between the inclinations of the screen surface and the film surface. The solid line illustrates a state wherein both the screen surface and the film surface are horizontal. As the screen surface is rotated to the position 202' as indicated by a broken line, the film surface is rotated to a position F' as indicated by a broken line correspondingly. That is, the screen 202 and the film F is rotated correspondingly with respect to the optical axis such that the length of the light path between an end A1 of the screen and an end B1 of the film is equal to that between an end A2 of the screen and an end B2 of the film.

Next, the operation of this embodiment will be described.

In the reader mode, the user rotates the knob 226 to adjust the inclination angle of the screen 208 so as to be suitable for his line of sight, posture, or the like. At this time, the inclination angle data of the screen 208 is sent to the control circuit 272 via the sensor 251. Based on the data and the film inclination angle data sent from the film inclination angle detecting sensor 271, the control circuit 272 drives the carrier rotating motor to rotate the film carrier 206 such that the film surface at the lighting position is rotated at the inclination angle corresponding to the inclination of the screen 208.

Figure 17:
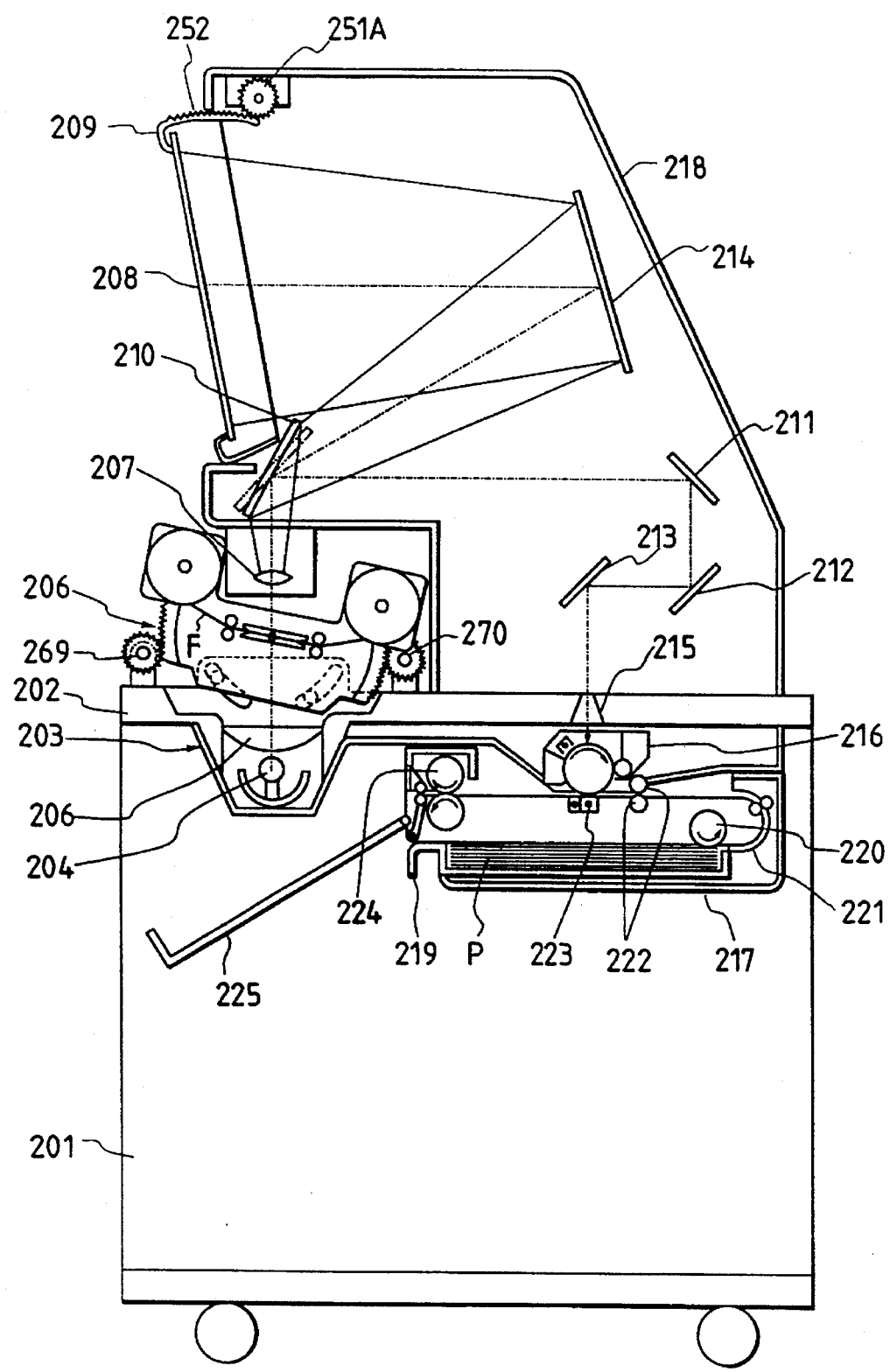
FIG. 17 is a schematic diagram of the microfilm reader printer of the eighth embodiment, wherein the screen and the film carrier are rotated.
Figure 18:
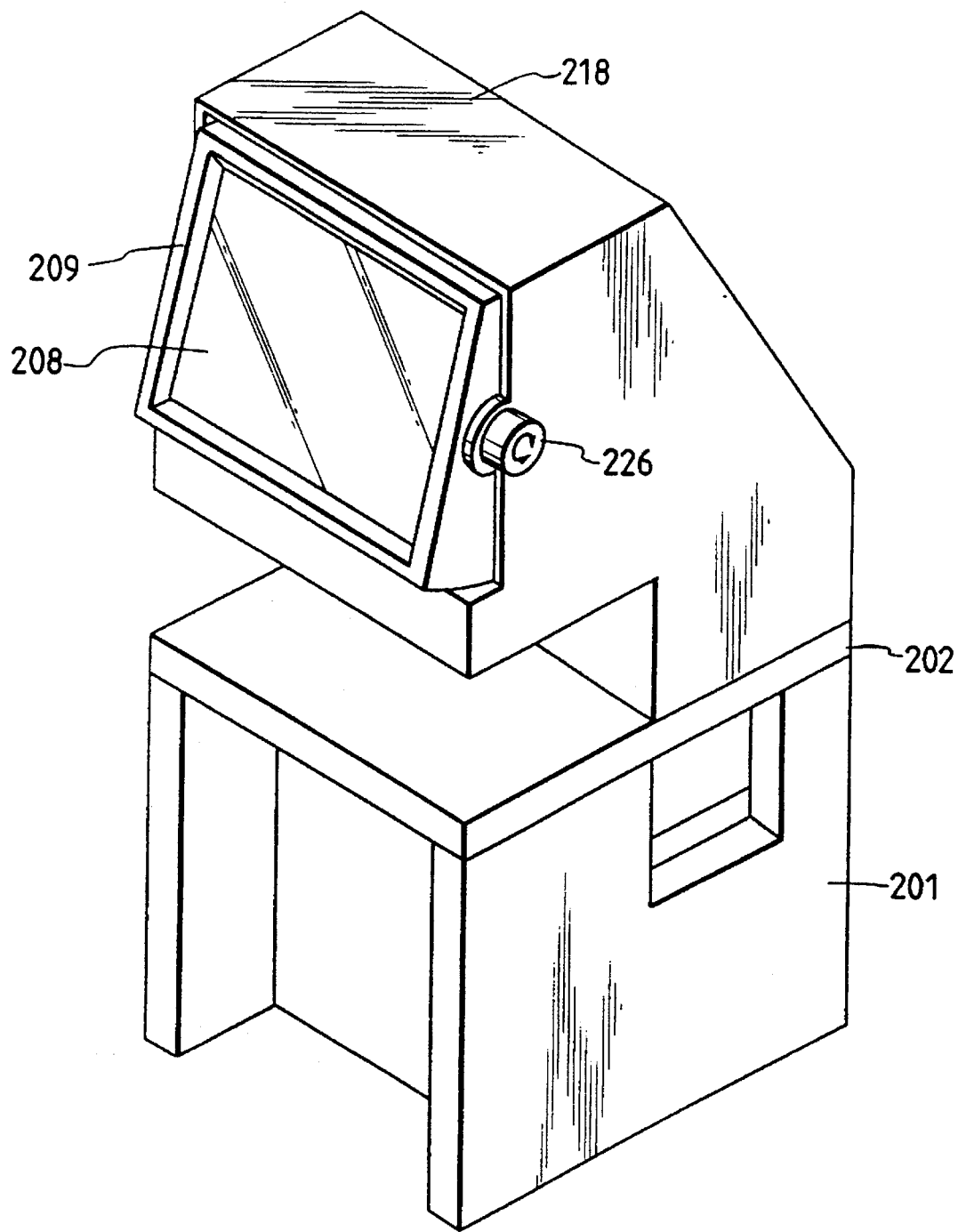
FIG. 18 is a schematic perspective view of the microfilm reader printer of the eighth embodiment.

FIG. 16 illustrates a state wherein the screen 208 is inclined upwardly while FIG. 17 illustrates a state wherein the screen 208 is inclined downwardly. The screen 208 and the film carrier 206 are structured so as to be retained at predetermined inclination angle positions.

Next, the operation in the print mode will be described. When printing is performed in a state with the film carrier 206 inclined, the projected image on the sensitive drum 216A becomes out of focus and the printed image will be blurred. Therefore, in the print mode, the inclination angle of the film carrier 206 is changed again to set the surface of the film disposed at the lighting position to be at a predetermined angle (horizontal angle in this embodiment).

Figure 21:
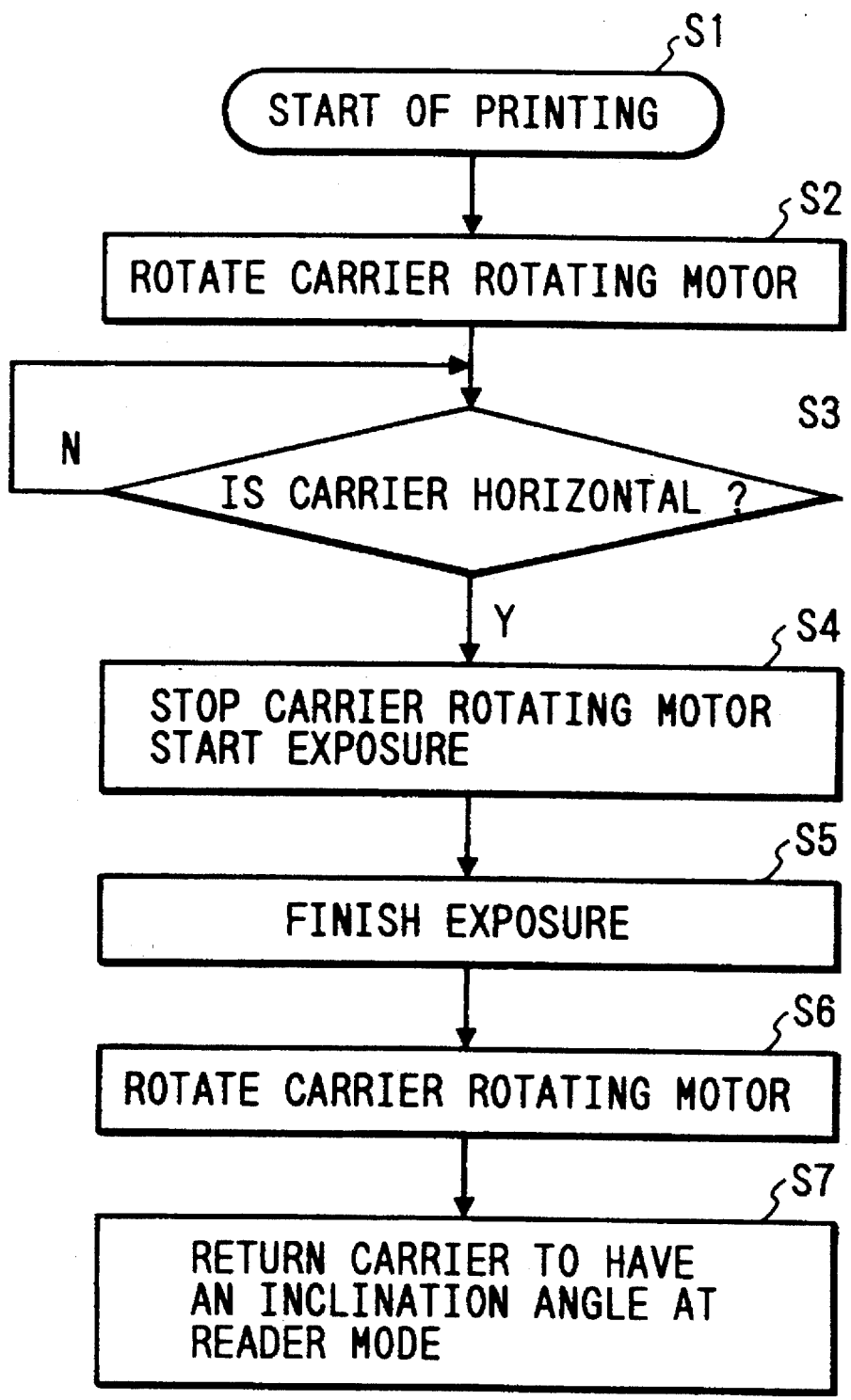
FIG. 21 is a flowchart for illustrating the operation of the film carrier in the printer mode of the eighth embodiment.

FIG. 21 illustrates a flowchart for controlling rotation of the film carrier 206 in the print mode.

When the copy key is depressed to start printing in the Step 1, the carrier rotating motor is rotated as in the Step 1 until the surface of the film between the pressure plates 256, 257 is made to be horizontal as in the Step 3. Thereafter, in the Step 4, the carrier rotating motor is stopped and the printing operation is started. Then, the image of the film is exposed on the sensitive drum 216A as in the Step S4.

After the exposure operation to the sensitive drum 216A has been completed as in the Step S5, the carrier rotating motor is again rotated as in the Step S6. Then, when the film carrier 206 is returned to the initial position at the inclination angle at the time of the reader mode as in the Step S7, the carrier rotating motor is stopped to cause the film carrier 206 to be in the state of the reader mode and the image of the film is projected again on the screen 208.

As described above, the inclination angle of the screen 208 can be adjusted by rotating the knob 226 so as to be suitable for the user's line of sight or to prevent the external light reflected by the screen surface from entering the user's eyes.

Also, as the film surface is rotated in accordance with the rotation of the screen surface such that the length of the light path between the film surface and the screen surface is kept always constantly, it is possible to observe the image of high quality at all times.

Figure 23:
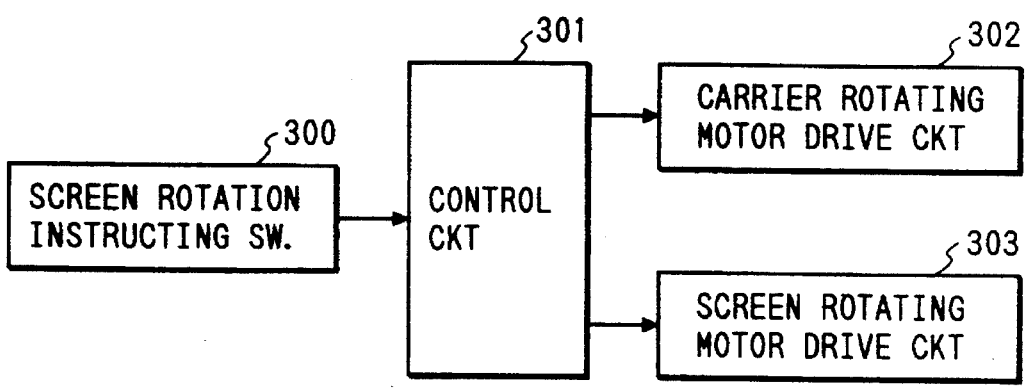
FIG. 23 is a block diagram of the control circuit of the ninth embodiment according to the present invention.
Figure 22:
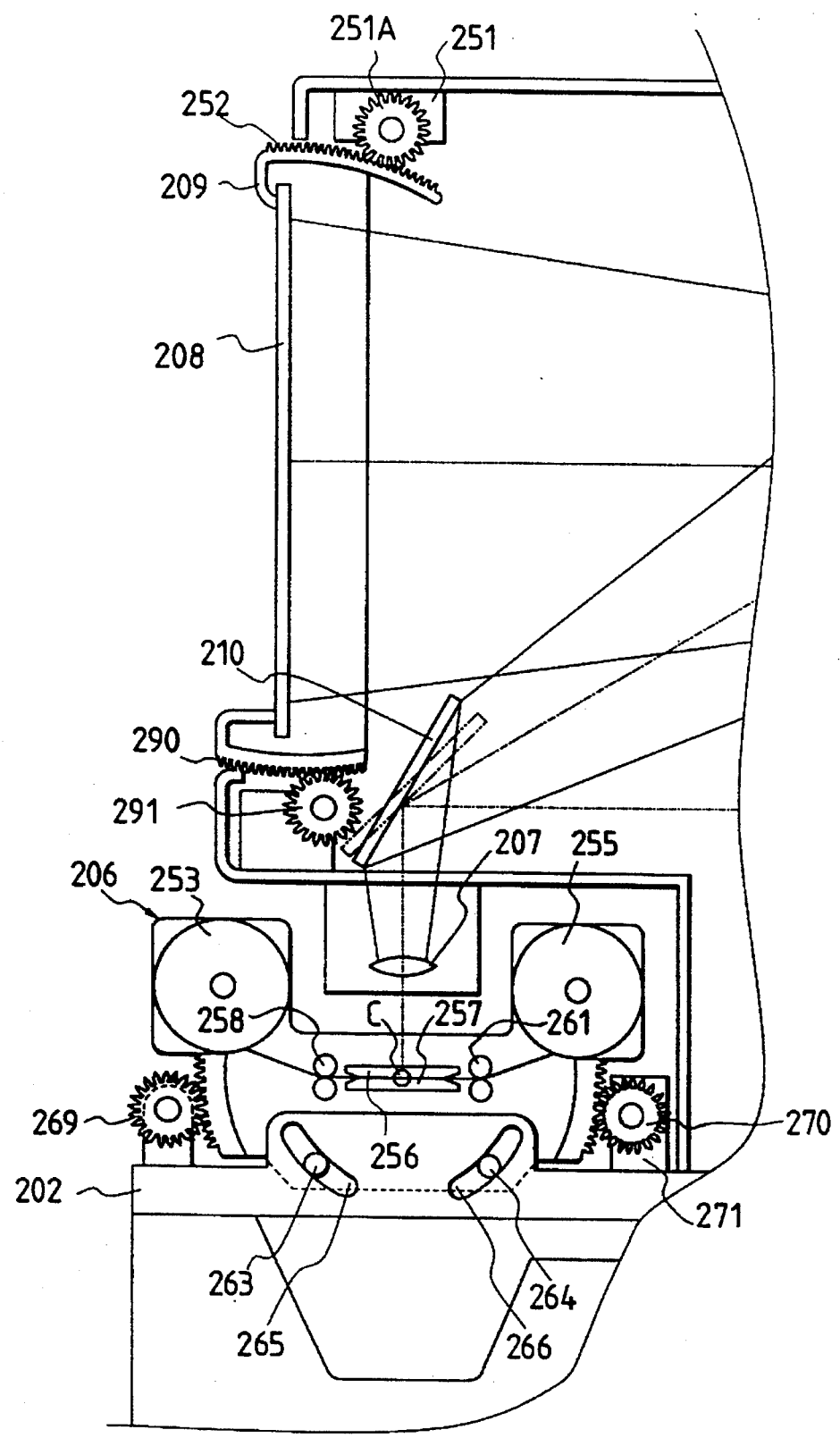
FIG. 22 is a schematic diagram illustrating the essential portion of a microfilm reader printer of a ninth embodiment according to the present invention.

FIGS. 22 and 23 illustrate a ninth embodiment according to the present invention, wherein elements identical to those in the eighth embodiment are designated by the identical numeral numbers.

In the eighth embodiment, as the screen 208 is inclined by the user and thereafter the film carrier 206 is inclined in accordance with the inclination thereof, it takes a certain time for the projected image on the screen 208 to become in-focus after the screen 208 is inclined.

In the ninth embodiment, the screen 208 and the film carrier 206 are automatically and simultaneously rotated by operating a key switch for instructing the amount and direction of rotation of the screen 208.

In FIG. 22, the screen frame 209 is provided on a lower portion with a rack 290 which is engaged with a drive gear 291. The drive gear 291 is connected to a screen rotating motor (not illustrated). When the screen rotating motor is driven, the screen 208 is rotated upwardly or downwardly via the gear 291 and the rack 290.

FIG. 23 is a block diagram of a control circuit for controlling the inclination angles of the screen 208 and the film carrier 206.

In FIG. 23, a screen rotation instructing switch 300 is the key switch for instructing the amount and direction of rotation of the screen 208. While operated, the instructing switch 300 outputs a rotation instructing signal. Based on the rotation instructing signal, a control circuit 301 rotates the carrier rotating motor in a predetermined direction via a carrier rotating motor drive circuit 302 and rotates the screen rotating motor in a predetermined direction via a screen rotating motor drive circuit 303 in order to rotate the film carrier 206 and the screen 208 at respectively corresponding angles to the operation of the instructing switch 300.

According to this embodiment, the screen and the film can be rotated simultaneously, enabling the efficient observation operation.

The rotation amount of the screen may be inputted by figure keys or the like after depression of the instructing switch.

As described above, in the image projecting apparatus according to the present invention, the screen is rotatable, so that the inclination angle of the screen surface can be adjusted such that the screen surface is perpendicular to the user's line of sight or the external light reflected by the screen surface is prevented from entering the user's eyes. Therefore, the user can observe the projected image on the screen with ease.

In this case, as the film surface is rotated in accordance with the change of the inclination angle of the screen such that the length of the light path between the screen surface and the film surface is kept always constant. Therefore, the projected image on the screen surface will not be blurred.

What is claimed is:

1. An image projecting apparatus comprising:
   illuminating means disposed in an apparatus body for illuminating an image carrying member;
   a screen disposed in said apparatus body such that an inclination angle of said screen can be adjusted;
   an optical system for projecting an image of said image carrying member illuminated by said illuminating means on said screen, said optical system including at least one mirror with an adjustable inclination angle; and
   means for inclining said screen and said mirror, with said inclining means inclining said mirror in accordance with inclination of said screen so that said screen and said mirror may be inclined at different angles from each other.

2. An image projecting apparatus according to claim 1, wherein said inclining means includes connecting means for rotating said screen and said mirror in coordination with each other.

3. An image projecting apparatus according to claim 1, wherein said screen is manually rotatable.

4. An image projecting apparatus according to claim 2, wherein said system includes a plurality of mirrors and an inclination angle of at least one of said plurality of mirrors is screen and said mirror are rotated about a common fulcrum.

5. An image projecting apparatus according to claim 4, wherein said connecting means rotates said mirror by an angle θ/2 when said screen is rotated by an angle θ.

6. An image projecting apparatus according to claim 1, wherein said optical system includes a plurality of mirrors with adjustable inclination angles.

7. An image projecting apparatus according to claim 1, wherein said screen and said mirror are rotated in coordination so that an image of the film is projected onto substantially the same position on said screen.

8. An image projecting apparatus according to claim 2, further comprising drive means for rotating said screen and said rotatable mirror.

9. An image projecting apparatus according to claim 1, further comprising detecting means for detecting the inclination angle of said screen and drive means for rotating said mirror in accordance with said detected inclination angle of said screen.

10. An image projecting apparatus according to in claim 1, wherein said screen is a transmission-type diffusion plate.

11. An image projecting apparatus according to claim 1, further comprising means for controlling a light amount of said illuminating means in accordance with the inclination angle of said screen.

12. An image projecting apparatus according to in claim 1, further comprising means for limiting an amount of external light to be incident on said screen in accordance with the inclination angle of said screen.

13. An image projecting apparatus according to claim 12, wherein said limiting means is a light-shielding member which is shiftable at an upper portion of said screen.

14. An image projecting apparatus according to in claim 1, further comprising printing means for printing the image of said image carrying member and selecting means for selectively projecting the image of said image carrying means on said screen or said printing means.

15. An image projecting apparatus according to claim 14, further comprising a display member provided with an index for indicating an effective printing area, said index of said display member being projected on said screen.

16. An image projecting apparatus according to claim 1, wherein said image carrying member is a microfilm.

17. A reader printer comprising:
   a light source;
   optical means for projecting an image of a film illuminated by said light source, said optical means including an image forming lens and at least one mirror whose inclination angle is adjustable;
   a screen for observing the image of said film projected by said optical means, an inclination angle of said screen being adjustable;
   means for inclining said mirror by a different inclination angle from that of said screen when the inclination angle of said screen is changed; and
   printing means for printing the image of said film projected by said optical means.

18. An image projecting apparatus according to claim 17, wherein both said mirror and said screen are rotatable with an optical axis of said optical means as a center.

19. An image projecting apparatus according to claim 18, further including rotation transmitting means for rotating said mirror in accordance with rotation of said screen.

20. An image projecting apparatus according to claim 17, wherein said mirror is rotated such that an optical axis of said optical means is approximately perpendicular to said screen.

21. A film reader, comprising:
   illumination means for illuminating a film;
   film inclining means for changing an inclination angle of a surface of a film located at an illumination position of said illumination means;

optical means for projecting an image of the film located at said illumination position onto a screen;

screen inclining means for changing an inclination angle of the screen; and means for actuating said film inclining means to incline said film surface in accordance with a change in the inclination angle of said screen.

22. A film reader, comprising:

illumination means for illuminating a film;

optical means for projecting an image of the film illuminated by said illumination means onto a screen;

screen inclining means for changing an inclination angle of said screen; and means for changing a brightness at a surface of said screen in accordance with the inclination angle of said screen.

23. A film reader according to claim 22, wherein said changing means controls an amount of illumination light emitted by said illumination means.

24. A film reader according to claim 22, wherein said changing means controls an amount of external light incident onto a surface of said screen.

* * * * *

UNITED STATES PATENT AND TRADEMARK OFFICE
CERTIFICATE OF CORRECTION

PATENT NO. : 5,486,882
DATED : January 23, 1996
INVENTOR(S) : Yamaguchi et al.

It is certified that error appears in the above-indentified patent and that said Letters Patent is hereby corrected as shown below:

COLUMN 12:

Line 61, "microfilm." should read --microfilm--.

COLUMN 15:

Line 61, "system includes a plurality of mirrors and an" should be deleted.
  Line 62 should be deleted.
  Line 63, "is" should be deleted.
  Line 67, "angle$\theta$." should read --angle $\theta$.--.

COLUMN 16:

Line 15, "in" should be deleted.
  Line 21, "in" should be deleted.
  Line 28, "in" should be deleted.

Signed and Sealed this

Second Day of July, 1996

Attest:

BRUCE LEHMAN

Attesting Officer     Commissioner of Patents and Trademarks